United States Patent
Bernini et al.

(10) Patent No.: US 8,140,090 B2
(45) Date of Patent: Mar. 20, 2012

(54) METHOD AND SYSTEM FOR ESTIMATING TRAFFIC DISTRIBUTION IN A CELLULAR MOBILE RADIO COMMUNICATIONS NETWORK

(75) Inventors: Antonio Bernini, Turin (IT); Paola Bertotto, Turin (IT); Stefano Macagno, Turin (IT); Guglielmo Tomaselli, Turin (IT)

(73) Assignee: Telecom Italia S.p.A., Milan (IT)

( * ) Notice: Subject to any disclaimer, the term of this patent is extended or adjusted under 35 U.S.C. 154(b) by 724 days.

(21) Appl. No.: 11/992,550

(22) PCT Filed: Sep. 27, 2005

(86) PCT No.: PCT/EP2005/010409
§ 371 (c)(1),
(2), (4) Date: Mar. 25, 2008

(87) PCT Pub. No.: WO2007/038948
PCT Pub. Date: Apr. 12, 2007

(65) Prior Publication Data
US 2009/0143064 A1    Jun. 4, 2009

(51) Int. Cl.
H04W 24/00    (2009.01)
H04B 7/00    (2006.01)
(52) U.S. Cl. ............... 455/453; 455/446; 455/115.3
(58) Field of Classification Search ............... None
See application file for complete search history.

(56) References Cited

U.S. PATENT DOCUMENTS

| | | | |
|---|---|---|---|
| 5,519,884 A * | 5/1996 | Duque-Anton et al. | 455/450 |
| 5,710,758 A | 1/1998 | Soliman et al. | |
| 5,835,859 A * | 11/1998 | Doner | 455/447 |
| 6,111,857 A | 8/2000 | Soliman et al. | |
| 6,112,092 A * | 8/2000 | Benveniste | 455/450 |
| 6,128,500 A * | 10/2000 | Raghavan et al. | 455/453 |
| 6,173,186 B1 * | 1/2001 | Dalley | 455/446 |
| 6,785,547 B1 * | 8/2004 | Heiska et al. | 455/446 |
| 6,934,555 B2 * | 8/2005 | Silva et al. | 455/522 |
| 6,985,735 B2 * | 1/2006 | Gustafsson | 455/446 |
| 7,050,812 B2 * | 5/2006 | Boyer et al. | 455/446 |
| 7,729,262 B2 * | 6/2010 | Crandall et al. | 370/238 |

(Continued)

FOREIGN PATENT DOCUMENTS
WO    WO-02/080602 A1    10/2002

(Continued)

*Primary Examiner* — Rafael Pérez-Gutiérrez
*Assistant Examiner* — Frank Donado
(74) *Attorney, Agent, or Firm* — Finnegan, Henderson, Farabow, Garrett & Dunner, L.L.P.

(57) ABSTRACT

A method for estimating a territorial distribution of traffic in a selected area of a cellular radio mobile communications network, includes: dividing the selected area into a plurality of traffic-generating area elements; determining overall traffic in respect of said selected network area; and distributing the overall traffic across the plurality of traffic-generating area elements. For distributing the traffic, a respective network traffic generation propension is calculated for each traffic-generating area element, wherein said network traffic generation propension is adapted to provide an indication of a forecasted population of users of the network in respect of the traffic generating area element; and a distribution of a radio electromagnetic field associated with a current network configuration across said selected area is also estimated, obtaining an indication of the radio electromagnetic field strength in each of said traffic-generating area elements, each of said traffic-generating area elements being assigned a respective overall traffic portion based on the respective network traffic generation propension and on the respective indication of the radio electromagnetic field strength.

19 Claims, 10 Drawing Sheets

U.S. PATENT DOCUMENTS

| | | |
|---|---|---|
| 7,768,968 B2 * | 8/2010 | Plehn et al. .................... 370/329 |
| 2003/0129987 A1 * | 7/2003 | Tanay et al. ................... 455/450 |
| 2003/0186693 A1 | 10/2003 | Shafran et al. |
| 2004/0082335 A1 * | 4/2004 | Hirayama et al. ............ 455/450 |
| 2004/0116124 A1 | 6/2004 | Lepschy et al. |
| 2004/0214577 A1 * | 10/2004 | Borst et al. .................... 455/446 |
| 2005/0153704 A1 * | 7/2005 | Luss et al. ..................... 455/453 |
| 2007/0025313 A1 * | 2/2007 | Bhagwat et al. ............... 370/338 |
| 2007/0066317 A1 * | 3/2007 | Amft et al. .................... 455/446 |
| 2008/0004028 A1 * | 1/2008 | Vincent ......................... 455/446 |

FOREIGN PATENT DOCUMENTS

| | | |
|---|---|---|
| WO | WO-2005/076645 A1 | 8/2005 |
| WO | WO-2005/076646 A1 | 8/2005 |

\* cited by examiner

FIG. 9
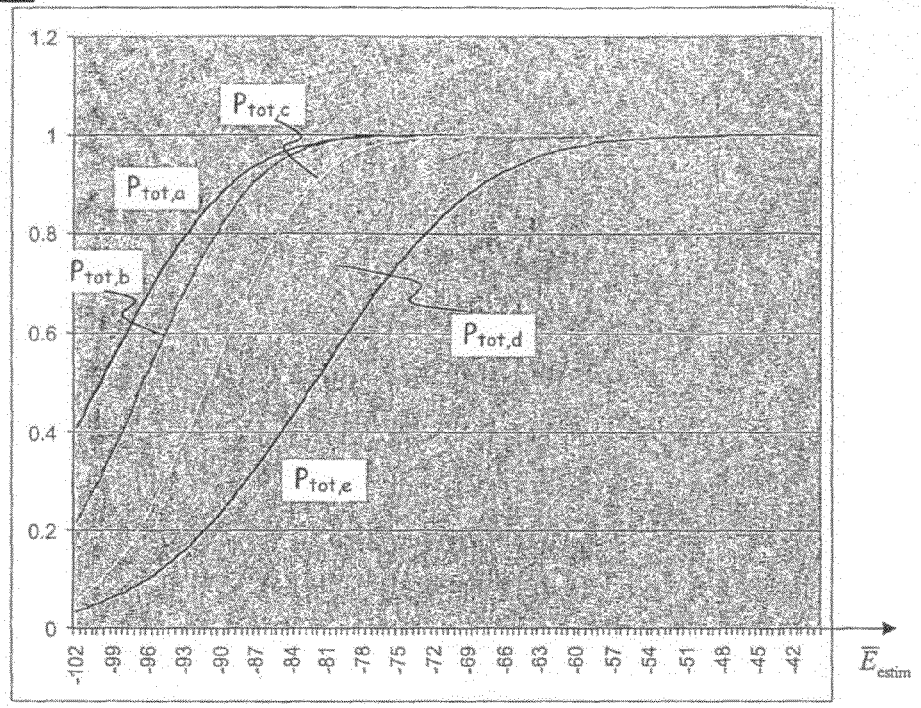
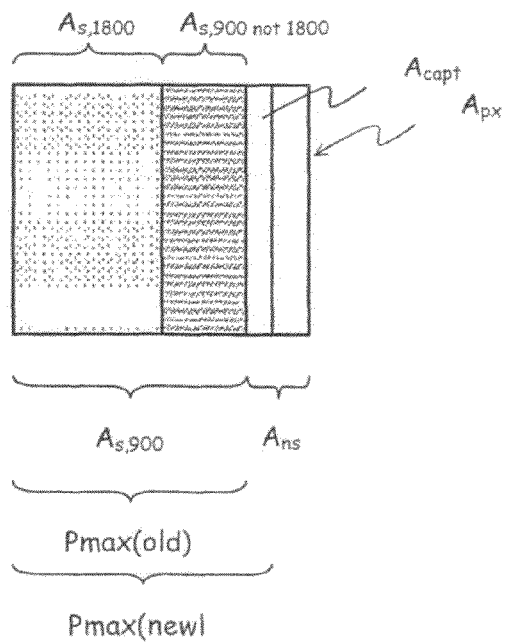
FIG. 10

METHOD AND SYSTEM FOR ESTIMATING TRAFFIC DISTRIBUTION IN A CELLULAR MOBILE RADIO COMMUNICATIONS NETWORK

CROSS REFERENCE TO RELATED APPLICATION

This application is a national phase application based on PCT/EP2005/010409, filed Sep. 27, 2005, the content of which is incorporated herein by reference.

BACKGROUND OF THE INVENTION

1. Field of the Invention

The present invention generally relates to the field of radio communications networks planning, particularly to the planning of cellular mobile radio communications networks like for example GSM (Global System for Mobile communications) networks and UMTS (Universal Mobile Telecommunications System) networks.

2. Description of the Related Art

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section of the document.

As known, a cellular mobile radio communications network includes a plurality of antennas or radio base stations, each one providing radio communications coverage in a respective geographic area, referred to as a cell.

Deploying a cellular mobile radio communications network includes planning the location, the configuration and the radio communications resources (e.g., GSM radio carriers) to be allocated to the different radio base stations.

In particular, the aim of the network designers is to ensure that each radio base station has sufficient radio resources to serve all the traffic that is expected to be generated by the users' mobile communications terminals located in the respective cell (so as for example to minimize blocked calls and dropped calls), without however wasting precious radio resources.

One of the key aspects in the planning of cellular mobile radio communications networks is the ability to forecast, estimate the distribution of the network traffic in the geographic area intended to be covered by the network under planning (which may be a new area of coverage of a mobile cellular radio communications network, or an already deployed network area, which needs to be updated).

A correct forecast of the traffic distribution is indeed essential to a proper dimensioning of the radio resources of the different cells of a network area to be planned, and thus to the capability of satisfying the requests by the users, thereby providing a highly satisfactory service thereto.

A method for estimating traffic distribution in a mobile communication network is disclosed in the published US patent application US 2003/0186693. The method disclosed in that document includes collecting statistical information with regard to a quantity of communication traffic and with regard to quality indicators associated with the traffic in a region served by the mobile communications network. The quality indicators include the average carrier/interference (C/I) ratio, specific levels of interference from other cells, and frequency of handovers between cells. The region is divided into areas belonging to respective traffic types. A respective traffic density is estimated for each of the traffic types based on the statistical information collected with regard to the quantity of the traffic and the quality indicators. According to that document, the resulting traffic density map allows optimization of the antenna configuration and frequency distribution among the cells.

SUMMARY OF THE INVENTION

The Applicant has observed that a drawback of the method disclosed in the cited document is that, in the construction of the traffic density map, no account is taken of those aspects concerning the electromagnetic field distribution across the area under planning; thus, the traffic density map may result not very accurate and not true to reality.

The Applicant has tackled the problem of estimating the distribution of network traffic in a more accurate and close-to-reality way.

In particular, the Applicant has found that a more realistic estimation of the distribution of the network traffic is achieved by taking into account an estimation of the distribution on the territory of the electromagnetic field generated by the radio base stations of the network area under planning.

Essentially, according to the present invention, the area under planning is ideally divided into relatively small, elementary traffic-generating areas, also referred to as pixels, and a capability of generating traffic of the generic pixel is calculated taking into account an estimated coverage of said pixel by the electromagnetic field produced by the radio base stations of the network area under planning.

According to an aspect of the present invention, a method for estimating traffic distribution in a cellular radio communications network is provided The method comprises:

dividing the selected area into a plurality of traffic-generating area elements;

determining an overall traffic in respect of said selected network area; and distributing the overall traffic across the plurality of traffic-generating area elements.

Said distributing further comprises:

calculating, for each of said traffic-generating area element, a respective network traffic generation propension, wherein said network traffic generation propension is adapted provide an indication of a forecasted population of users of the network in respect of the traffic generating area element;

estimating a distribution of a radio electromagnetic field associated with a current network configuration across said selected area, said estimating including obtaining an indication of the radio electromagnetic field strength in each of said traffic-generating area elements; and assigning to each of said traffic-generating area elements a respective overall traffic portion based on the respective network traffic generation propension and on the respective indication of the radio electromagnetic field strength, e.g. weighting the former by means of the latter.

For the purposes, of the present description, by traffic generation propension of a generic traffic-generating area element there is intended an information, e.g. a number adapted to provide an indication of a forecasted population of users of the network services (i.e., traffic-generating users) that will be present on that traffic-generating area element. Thus, the collection of traffic generation propensions in respect of all the traffic-generating area elements of the area under planning provides an indication, at the level of the pixels, of the distribution across the area under planning of a forecasted population of users of the network services.

Another aspect of the present invention, concerns a method comprising:

estimating territorial distribution of traffic in a selected area (100) of a cellular radio mobile communications network; and based on the estimated traffic distribution, modifying a current network configuration.

Said estimating is accomplished in accordance to the method according to the first aspect of the invention.

Other aspects of the present invention concerns a data processing system comprising means adapted to implement the steps of the method according to the first aspect of the invention, and a computer program comprising instructions for carrying out the steps of the method according to the first aspect of the invention.

BRIEF DESCRIPTION OF THE DRAWINGS

The features and advantages of the present invention will be made apparent by the following detailed description of some embodiments thereof, provided merely by way of non-limitative examples, description that will be carried out making reference to the attached drawings, wherein:

FIG. 9 is a diagram similar to that of FIG. 8, showing the changes in the percentage of coverage of a generic pixel by the electromagnetic field for different degrees of presence of buildings in the area of that pixel;

FIGS. 10 to 14 schematically shows exemplary changes in the network traffic estimated in respect of a generic pixel after possible changes in the network configuration;

DETAILED DESCRIPTION OF THE PREFERRED EMBODIMENT(S)

Figure 1:
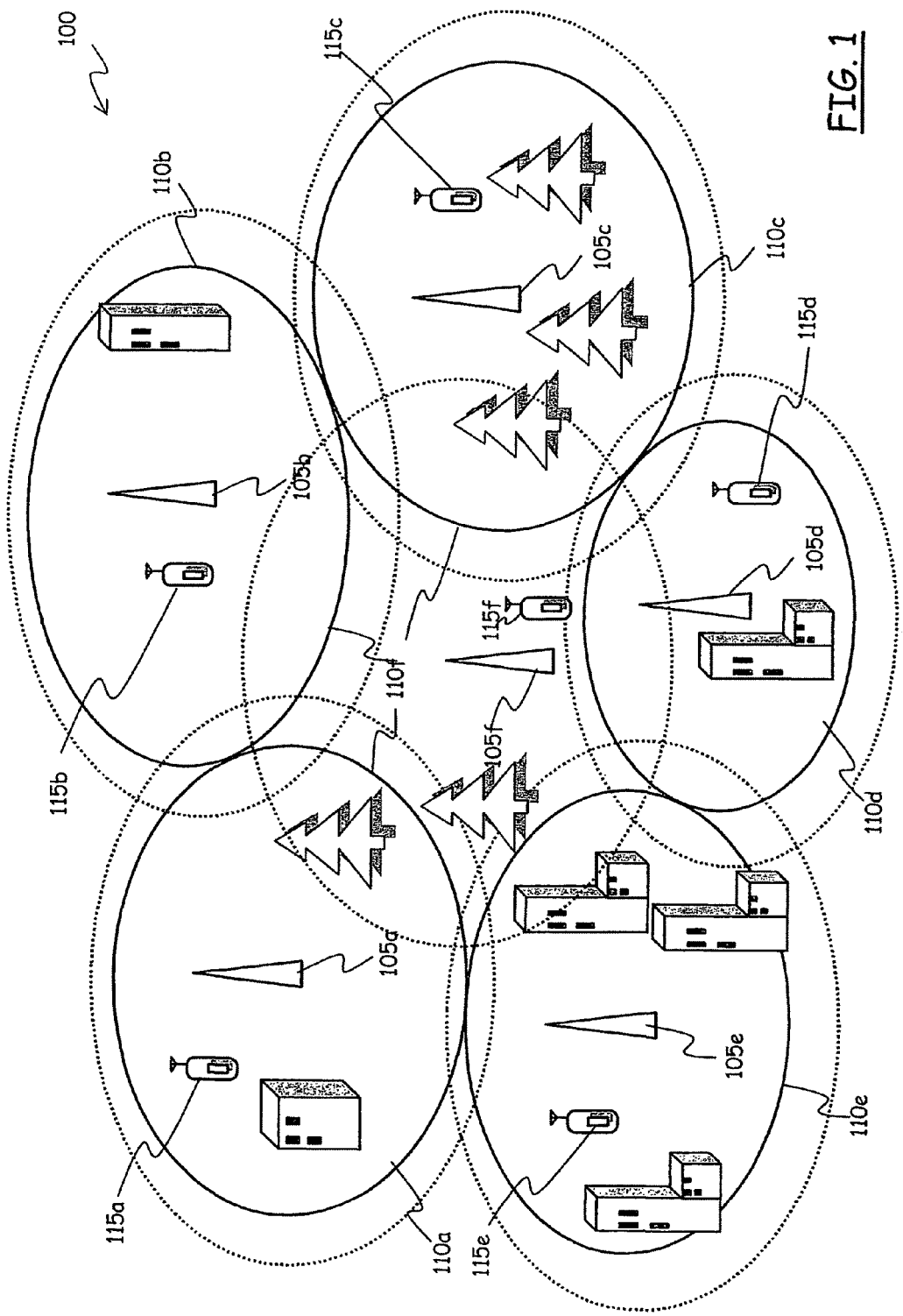
FIG. 1 pictorially shows a portion of a geographic area covered by a cellular mobile radio communications network.

Making reference to FIG. 1, there is schematically shown a geographic area 100 covered by a cellular mobile radio communications network, for example an area of the network under planning. For example, the network may be a GSM network, or a UMTS network.

) Reference numerals 105*a* to 105*f* identifies five antennas, i.e. five radio base stations of the cellular network (e.g., Base Transceiver Stations—BTSs, in the case of a GSM network), corresponding to five network cells. In the drawing, dotted lines are used to pictorially show the areas of radio coverage of the radio base stations 105*a* to 105*f*, which partially overlaps; solid lines 110*a* to 110*e* encircle instead the so-called "best-server areas" of the different radio base stations 105*a* to 105*e*, i.e. those areas wherein the signal irradiated by the respective radio base station has an intensity higher than the signals irradiated by one or more of the other are radio base stations and possibly perceived within the area of the generic cell; the best-server area 110*f* of the radio base station 105*f* is the area delimited by the surrounding best-server areas 110*a* to 110*e*.

A level of urbanization of the territory generally varies both from cell to cell, and also within a cell: for example, the cell corresponding to the radio base station 105*e* may be located in a relatively high-density urban area, the cell corresponding to the radio base station 105*d* may be located in a medium-density urban area, the cells corresponding to the radio base stations 105*a*, 105*b* and 105*d* may be located in low-density urban areas, whereas the cells 105*c* and 105*f* are for example located in rural areas.

Reference numerals 115*a* to 115*f* identify mobile communications terminals, e.g. cellular phones, located in the respective cells and capable of accessing the network, thereby generating network traffic.

In order to plan a proper location, configuration and radio resource dimensioning (e.g., number of radio carriers to be allocated) in respect of the different radio base stations 105*a* to 105*f*, a forecast of the traffic that the network area 100 under planning will have to sustain is necessary.

Figure 2:
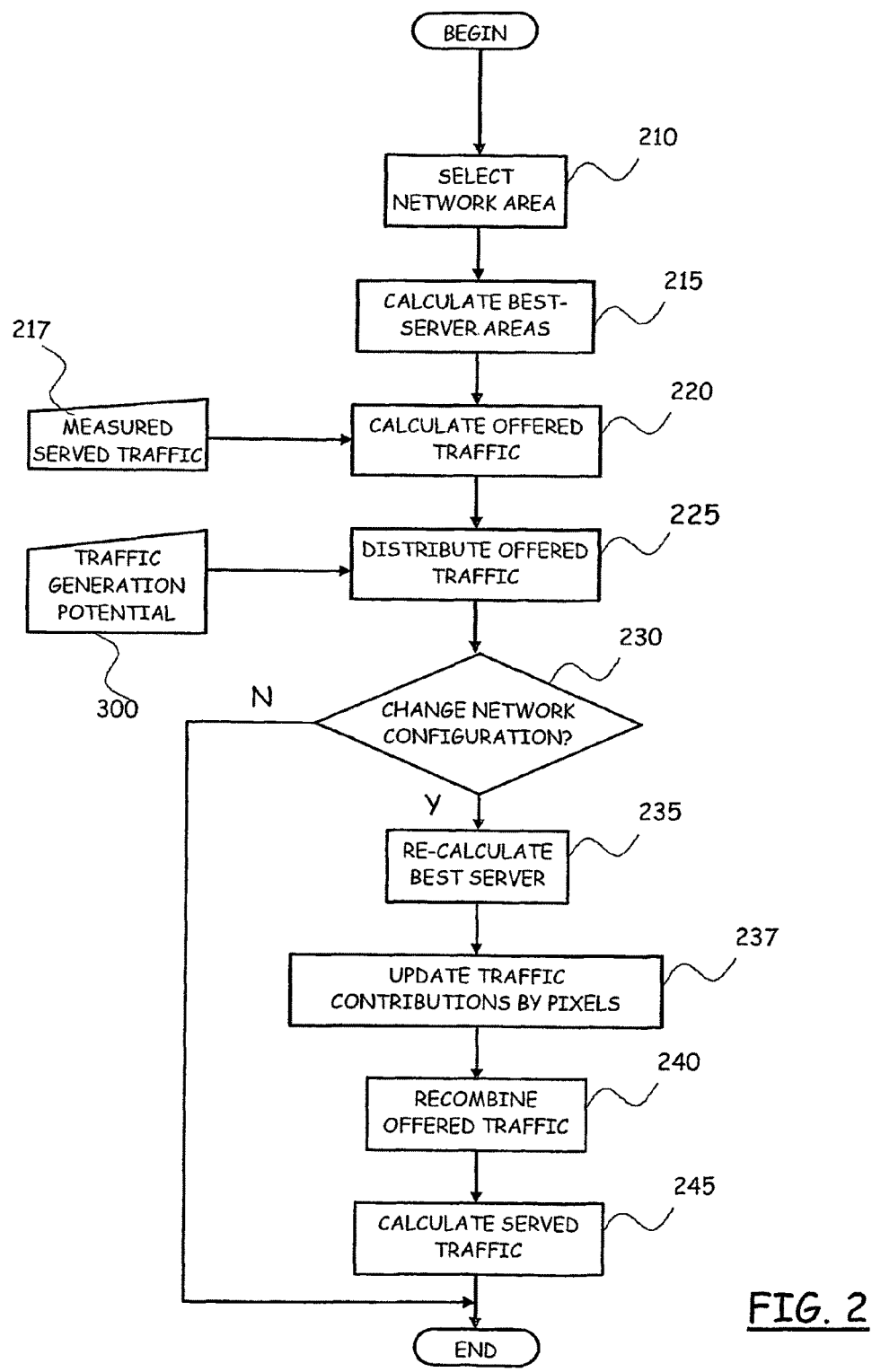
FIG. 2 is a schematic, simplified flowchart of a procedure for planning a dimensioning of the cellular mobile radio communications network, in an embodiment of the present invention.

The schematic flowchart of FIG. 2 illustrates the main steps of a procedure for forecasting the traffic in the area 100.

Firstly, the geographic area of interest 100 is selected (block 210). As mentioned in the foregoing, this can for example be an area of new coverage of a cellular mobile radio communications network, or an already covered area in which the mobile radio communications network needs to be upgraded (e.g., in terms of radio communications resources installed in the various radio base stations).

Subsequently, the best-server areas 110*a* to 110*f* of the different radio base stations 105*a* to 105*f* are calculated, for the cells belonging to the area 100 under consideration (block 215).

Figure 3:
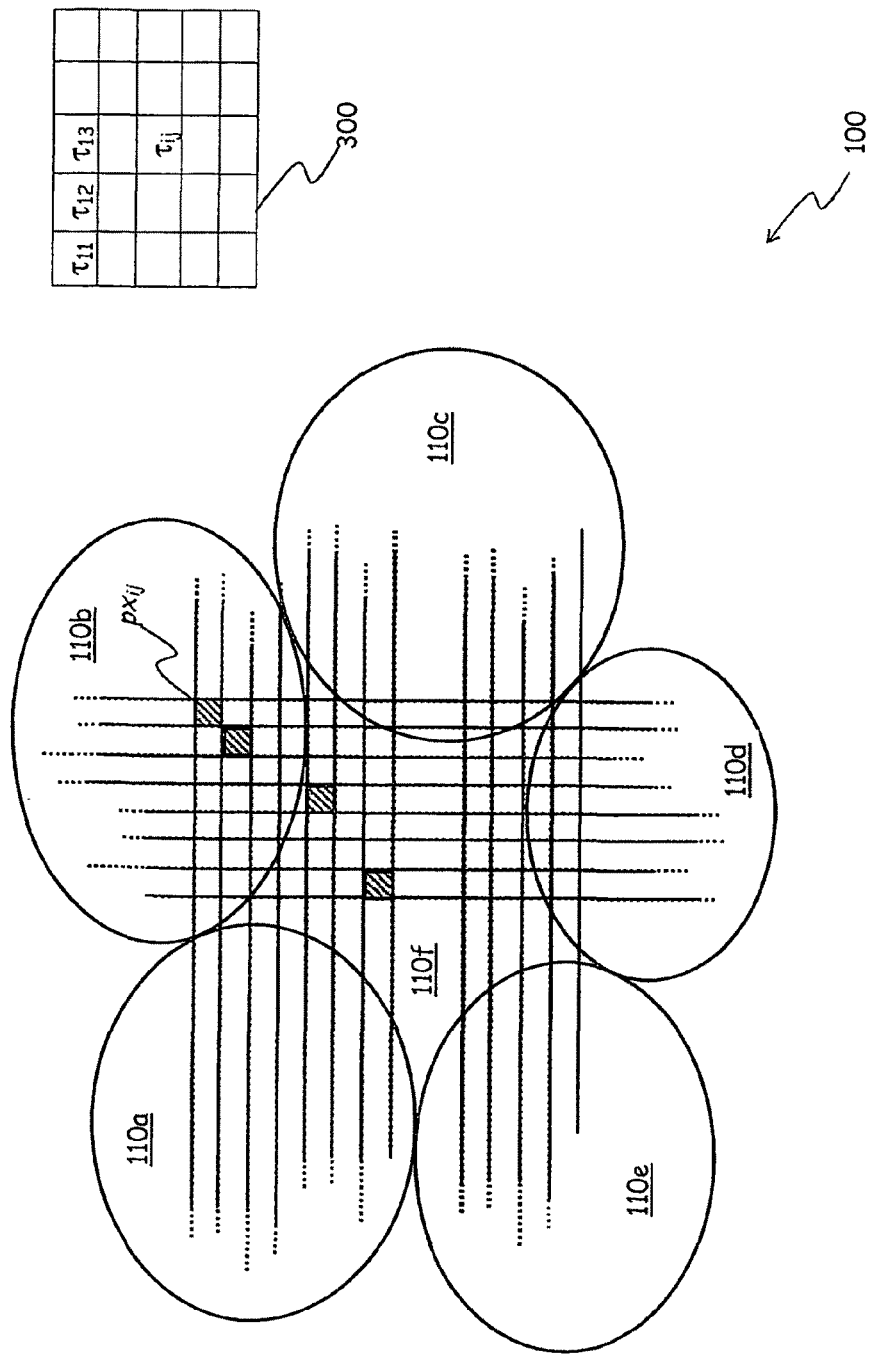
FIG. 3 schematically shows a subdivision into elementary traffic-generating areas, or pixels, of the portion of a geographic area covered by a cellular mobile radio communications network.

As schematically depicted in FIG. 3, in order to calculate the best-server areas, the geographic area of interest is ideally subdivided into relatively small, elementary traffic-generating area elements or pixels px, each pixel being an elementary, unit (in the shown example, square) area of predefined width, e.g. 1″ of latitude by 1″ of longitude.

In particular, calculating the best-server area means associating each pixel px to a respective radio base station which, compared to all the other radio base stations, produces in the pixel the best level of electromagnetic field.

The way the best-server areas are calculated is not critical and not limitative to the present invention. For example, taken the generic cell, the level of the electromagnetic field produced by the respective radio base station on the generic pixel px is calculated, and (provided that the electromagnetic field level exceeds a minimum threshold) it is compared to the value of the electromagnetic field produced by the radio base stations of the other cells on that pixel: the pixel px is assigned to the best-server area of that cell which produces the strongest electromagnetic field on that pixel.

In case the cellular mobile radio communications network has two or more different radio access layers, like the GSM 900 MHz and the GSM 1800 MHz access layers, the procedure described above is repeated for every radio access layer. Thus, a map of best-server areas is obtained in respect of each radio access layer.

A matrix 300 of traffic generation propension is then calculated, wherein, for the generic pixel $px_{ij}$ of the area 100 of interest, a respective traffic generation propension $\sigma_{ij}$ is calculated; in particular, the traffic generation propension $\sigma_{ij}$ of a generic pixel $px_{ij}$ is a number ranging from 0 to 1, and indicating a propension of that pixel $px_{ij}$ to generate traffic. The traffic generation propension of a generic pixel is a number adapted to provide an indication of a forecasted population of users of the network services (i.e., traffic-generating users) that will be present on that pixel. Thus, the matrix of traffic generation propension provides an indication, at the level of the pixels, of the distribution across the area under planning of a forecasted population of users of the network services.

In order to calculate the traffic generation propension, characteristic parameters of the territory are taken into account, like for example the presence of buildings, of communications routes like roads or railways, the morphology of the territory (nature of the area: urban, industrialized, open area; the orography).

In particular, and just by way of example, starting on information describing the territorial morphology of the geographic area of interest, like the dislocation of buildings, the orographic characteristics, the presence of roads, motorways, railways, and similar information, a first matrix of values is built, wherein each element (i,j) of the matrix corresponds to a respective pixel $px_{ij}$ of the area of interest, and is a number ranging for example from a lower limit, wherein the lower limit corresponds to an absence of network traffic, and the upper limit to a maximum level of network traffic. An averaging may preferably be implemented, so that the value of the generic element (i,j) of the matrix, corresponding to the pixel $px_{ij}$, is the average of the values of the neighboring matrix elements, corresponding to the surrounding pixels.

For example, a first matrix of values is calculated, wherein the generic element $\sigma_1(i,j)$ of the matrix, corresponding to a respective pixel $px_{ij}$, is assigned: a low value, for example equal to 0, for a low percentage of coverage of the area of the pixel by buildings, equal for example to 2%; a value equal to 10 times the percentage of coverage of the area of the pixel by buildings, if such percentage is in the range from 2% to 70%; and a high value, for example 700, for a percentage of coverage of the area of the pixel by buildings higher than, for example, 70%.

The values thus obtained are averaged, taking the nine neighboring matrix elements, corresponding to the nine surrounding pixels, thereby obtaining a second matrix of values $\sigma_2(i,j)$.

A third matrix of values is calculated taking, for the generic element $\sigma_3(i,j)$, the highest among the corresponding values $\sigma_1(i,j)$ and $\sigma_2(i,j)$, i.e. $\sigma_2(i,j)=\max[\sigma_1(i,j), \sigma_2(i,j)]$.

In a similar way, the information relating to the morphology of the territory (e.g., presence of woods, open areas, presence of fields, presence of lakes, rivers, and the like), the information relating to the presence of roads, motorways, railways, and so on are progressively taken into account.

At the end of the process, the matrix 300 is obtained whose elements takes values indicating the propension of the corresponding pixels to generate traffic.

Then, an offered traffic is calculated, on a network cell basis (block 220). The offered traffic is in particular calculated starting from data 217 of served traffic, obtained by measuring the traffic served by the network for a given, existing configuration and radio resource dimensioning of the radio base stations 105a to 105f are obtained, on a network cell basis.

In order to calculate the offered traffic from the measured served traffic, suitable methods and algorithms are exploited, which are adapted to calculate the offered traffic based on the radio resource dimensioning of the radio base stations 105a to 105f; a suitable method for calculating the offered traffic on a network cell basis exploits for example a method described in WO 02/080602; in particular, the method described in such patent application accepts as an input the offered traffic and a number of channels of a generic cell, and gives as a result an estimation of the cell's performance in terms of served traffic and losses. In the present case, the served traffic is assumed to be known, being the result of measures: the corresponding offered traffic can be estimated using iteratively the method described in WO 02/080602. Firstly, a starting offered traffic is taken, and, applying the method described in WO 02/080602, the corresponding served traffic is calculated; the calculated served traffic is compared to the measured served traffic, and, if they differ of less than a predefined minimum amount (e.g., 0.1 Erlang), the starting assumption on the offered traffic is taken as the offered traffic that corresponds to the measured served traffic. If instead the difference exceeds the predefined minimum amount, the offered traffic is varied, e.g. increased of an amount corresponding to the difference between the previously calculated served traffic and the measured served traffic, and the new served traffic is calculated applying the method described in WO 02/080602. The procedure is iterated until the calculated served traffic differs from the measured served traffic of less than the predetermined minimum quantity.

The offered traffic thus calculated is then distributed across the different pixels of the area of interest 100 (block 225), so as to obtain, for each pixel, a respective value of offered traffic, indicative of the traffic that will be offered to the network by that pixel. In the distribution of the offered traffic across the pixels, account is taken of the respective traffic generation propensions, as expressed in the matrix 300. A method according to an embodiment of the present invention by which the offered traffic is distributed across the different pixels will be described in greater detail later.

The distribution of the network offered traffic over the pixels of the area of interest 100 allows in particular the network designer to establish whether it is necessary or advisable to modify the network configuration (decision block 230), e.g. by modifying the radio equipment of the radio base stations 105a to 105f, or to add/remove radio base stations, or the like.

In the affirmative case (exit branch Y), the best server areas 110a to 110f are re-calculated (block 235).

The change in the network configuration causes in general a change in the traffic offered by the generic pixel; thus, the contributions to the offered traffic of the different pixels of the area of interest 100 are re-calculated and updated (block 237).

The process of modifying the network configuration and re-calculating the offered traffic contributions of the different pixels may be repeated once or more.

Once a network configuration that is considered satisfactory has been found, the distributed offered traffic is recombined, re-aggregated, taking into account the new best-server areas that, in general, will differ from those initially calculated (block 240).

The served network traffic corresponding to the new network configuration is then calculated (block 245).

A method according to an embodiment of the present invention for distributing of the network offered traffic (calculated starting from the measured served traffic) over the different pixels of the best-server areas in the area of interest will be now described.

In particular, according to an embodiment of the present invention, the distribution of the calculated offered traffic, derived from the measured served traffic, is carried out not only on the basis of the traffic generation propension, but also exploiting statistical weight functions, that are adapted to express a degree of coverage of a generic pixel by the radio signal of the radio transmitter of a generic cell to whose best-server area that pixel belongs. According to an embodiment of the present invention, the weight functions are used to weight the parameters indicating the traffic generation propensions of the pixels.

Figure 4:
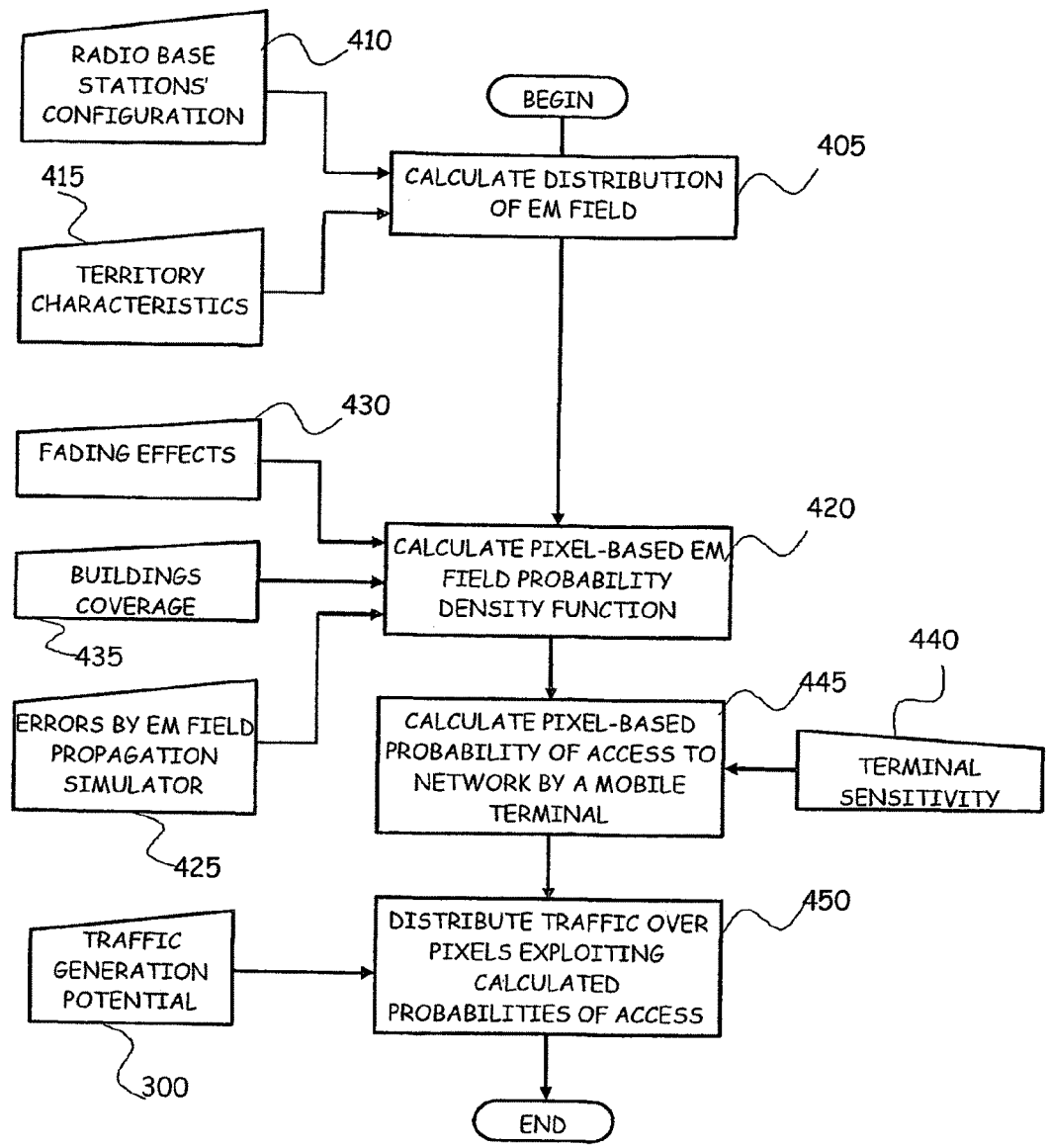
FIG. 4 is a schematic, simplified flowchart of a procedure for distributing the network traffic over the pixels, according to an embodiment of the present invention.

The offered traffic distribution method will be now described with the aid of the schematic flowchart of FIG. 4.

Firstly, exploiting suitable electromagnetic wave propagation simulation, algorithms of the type used for calculating the cell coverage, the distribution of the electromagnetic field irradiated by the radio base stations 105a to 105f in the area of interest 100 is calculated (block 405). Suitable cell coverage simulation algorithms for simulating the distribution of the electromagnetic field are for example described in WO 2005/076645 and WO 2005/076646.

In particular, in order to calculate the distribution of the electromagnetic field, the simulation algorithms exploit data (block 410) defining the configuration (radio equipment) of the radio base stations 105a to 105f and data (block 415) indicative of the characteristic of the territory of the area of interest 100 (i.e., characteristics like the territory morphology, orographic characteristics, presence of buildings, of roads, of railways, and the like).

According to an embodiment of the present invention, based on the estimated electromagnetic field distribution, calculated by means of the above-mentioned simulation algorithms, a weight factor P is calculated for each pixel of the area of interest 100, the weight factor P being a function of the estimated electromagnetic field distribution, and being adapted to provide a measure of the probability that an hypothetical mobile communications terminal, e.g. a cellular phone, located in that pixel, has of accessing the network services; in other words, the weight factor P provides a measure of the fraction of the area of the corresponding pixel that is "covered" by the electromagnetic field of the (best-server) radio base station 105a to 105f.

In order to obtain the weight factors P for the different pixels, probability density functions of the electromagnetic field strength in each pixel are calculated (block 420).

The values of the electromagnetic field, calculated by the simulation algorithms, are preferably corrected so as to take into account the intrinsic errors of the simulation algorithms (block 425), and the effects that cause variations in time of the value of the electromagnetic field measured at a generic point of space (block 430).

As known, the value of the electromagnetic field measured at a generic point of space differs from the value calculated by an electromagnetic field propagation simulator, due to intrinsic errors committed by the algorithms. Also, the electromagnetic field that can be measured at a generic point of the space varies in time, due for example to the so-called fading effects, particularly the slow fading effects.

Furthermore, the attenuation of the electromagnetic field caused by the presence of buildings needs to be considered (block 435). It is experimentally known that the indoor attenuation margins of the electromagnetic field, at an height of approximately 1.5 m from the ground (essentially, at the first floor of a building), are Gaussian variables; their average value and variance depends on the density of buildings in the area considered, and also on the radio frequency; for example, for the GSM 900 MHz frequency band and the GSM 1800 MHz frequency band the following values have been experimentally obtained:

|  | 900 MHz band | | 1800 MHz band | |
| --- | --- | --- | --- | --- |
|  | Ave [dB] | Std. dev. [dB] | Ave [dB] | Std. dev. [dB] |
| City center | 19.2 | 5.5 | 21.8 | 4.3 |
| Suburbs | 13.0 | 7.5 | 16.1 | 7.2 |

A parameter Edi can be adopted to numerically describe the degree of presence of buildings in a generic pixel; for example, the value of the parameter Edi may range from 0 to 1, wherein a parameter value Edi=0 corresponds to an essentially total absence of buildings in the area of that pixel, whereas a parameter value Edi=1 corresponds to a pixel whose area is essentially totally covered by buildings.

A reasonable assumption to be made for simplifying the calculations is that all the points belonging to a generic pixel have a statistically equivalent capability of generating traffic, i.e. that all the points making up a generic pixel feature a same capability of generating traffic.

Let it first be assumed that, in a generic pixel of the area of interest, no buildings are present (i.e., that it is Edi=0).

The probability density $f_{E_{lev}}(x)$ of the real (i.e., directly measured) electromagnetic field strength $E_{lev}$ in a generic pixel is a Gaussian random variable:

$$f_{E_{lev}}(x) = N(\overline{E}_{estim}, \sqrt{\sigma_1^2 + \sigma_2^2})$$

where $\overline{E}_{estim}$ denotes the average, in the considered pixel, of the electromagnetic field strength estimated by the electromagnetic field propagation simulation engines, $\sigma_1$ is the standard deviation of a Gaussian random variable (having zero average value) representing the indetermination $Err_F$ in the electromagnetic field value introduced by the slow fading effect:

$$Err_F = N(0, \sigma_1)$$

and $\sigma_2$ is the standard deviation of a further Gaussian random variable (having as well zero average value) representing the probability density of the error $Err_M$ due to the difference, in the pixel considered, between the estimated electromagnetic field value (estimated by the electromagnetic field propagation simulation engines), and the average of the directly measured electromagnetic field:

$$Err_M = N(0, \sigma_2).$$

It is known that the values of the standard deviation $\sigma_1$ associated with the slow fading effect of the electromagnetic field with respect to the average field perceived in a certain (e.g., rectangular) area depends on the typology of the area (presence of buildings, trees, and the like); the following standard deviation values $\sigma_1$ in respect of the slow fading effect for four different types of areas may be used:

open area with vegetation: 3.5 to 4.5 dB;
suburban area: 4.5 to 5.5 dB;
urban area: 5.5 to 6.5 dB;
dense urban area: 6.5 to 7.5 dB, where the first type of area (open area with vegetation) refers to an area in which there is a percentage of area covered by buildings of no more than approximately 5%; a suburban area is an area wherein the percentage of area covered by buildings ranges from approximately 5% to approximately 20%; an urban area is an area wherein the percentage of area covered by buildings ranges from approximately 20% to approximately 50%; a dense urban area is an area wherein the percentage of area covered by buildings is higher than approximately 50%.

A typical value for the standard deviation $\sigma_2$ for the probability density of the error $Err_M$ committed by an electromagnetic field propagation simulator may be of the order of few dB, for example it may be approximately equal to 6 dB.

Let S denote the effective sensitivity of the radio receiver of a generic mobile terminal, e.g. cellular phone (block 440); for the purposes of the present description, by effective sensitivity there is meant the terminal's static sensitivity, corrected by the body loss margin.

The probability $P_{outdoor}$ that, in a generic pixel for which the parameter Edi=0 (i.e., an outdoor pixel, in whose area there are no buildings), the mobile terminal senses an electromagnetic field equal to or higher than its effective sensitivity S is expressed by the following formula:

$$P_{outdoor} = P(E_{lev} > S) =$$

$$\int_S^{+\infty} f_{E_{lev}}(x) dx = \begin{cases} 1 - \frac{1}{2} \text{erfc}\left(\frac{S - \overline{E}_{estim}}{\sqrt{2\sigma_{outdoor}^2}}\right) & \text{if } S < \overline{E}_{estim} \\ \frac{1}{2} \text{erfc}\left(\frac{S - \overline{E}_{estim}}{\sqrt{2\sigma_{outdoor}^2}}\right) & \text{if } S \geq \overline{E}_{estim} \end{cases}$$

Figure 5:
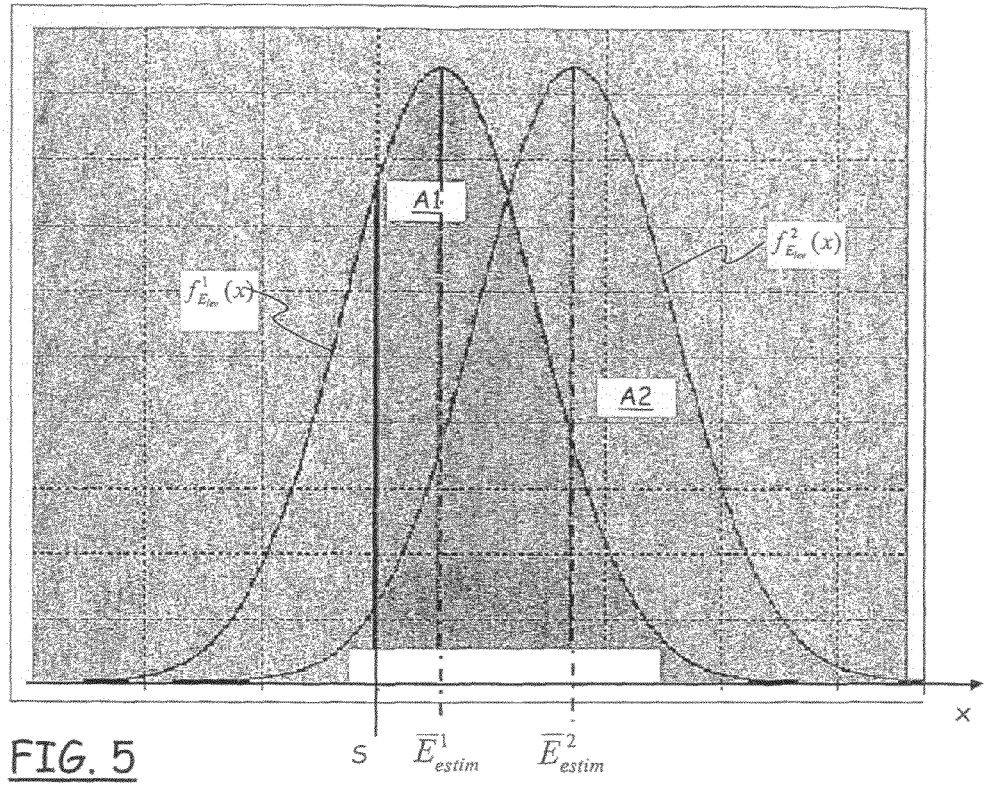
FIG. 5 is a diagram showing two probability density functions of the value of the electromagnetic field (generated by the radio base stations of the network) in a generic pixel of the area under planning, for two different average values of electromagnetic field estimated by an electromagnetic field distribution simulator adapted to simulate the distribution over the territory (at the level of the pixels) of the electromagnetic field generated by the radio base stations of the network.

The probability $P_{outdoor}$ thus calculated (block 445) may be interpreted as giving the percentage of points in the considered pixel in which the cellular network can be accessed by a generic mobile terminal, i.e. the percentage of the area of the pixel that is covered by the radio signal of the cellular network. Referring to FIG. 5, there are shown two exemplary Gaussian curves $f_{E_{lev}}^1(x)$ and $f_{E_{lev}}^2(x)$, corresponding to two different average values $\overline{E}_{estim}^1$ and $\overline{E}_{estim}^2$ of the estimated electromagnetic field strength in a generic pixel, with $\overline{E}_{estim}^2 > \overline{E}_{estim}^1$. Two different probability values $P^1_{outdoor}$ and $P^2_{outdoor}$ are obtained, corresponding to the different areas A1 and A2 subtended by the Gaussians curves $f_{E_{lev}}^1(x)$ and $f_{E_{lev}}^2(x)$, from x=S to +∞. It can be appreciated that the higher the average estimated electromagnetic field value, the higher the probability that, for a given effective sensitivity S, the mobile terminal can access the cellular network, i.e. the higher the coverage of the network in the considered pixel. Indeed, if the average estimated electromagnetic field value is sufficiently high, the variations in the real (i.e., actually perceived) electromagnetic field caused by (slow) fading effects and by errors of the electromagnetic field distribution simulators do not cause the electromagnetic field value to fall below the sensitivity S of the mobile terminal, which represents the lower threshold for the capability of the terminal of accessing the network; thus, for a sufficiently high average estimated electromagnetic field value, the generic mobile terminal is able to access the network in essentially every point of a generic pixel.

Figure 6:
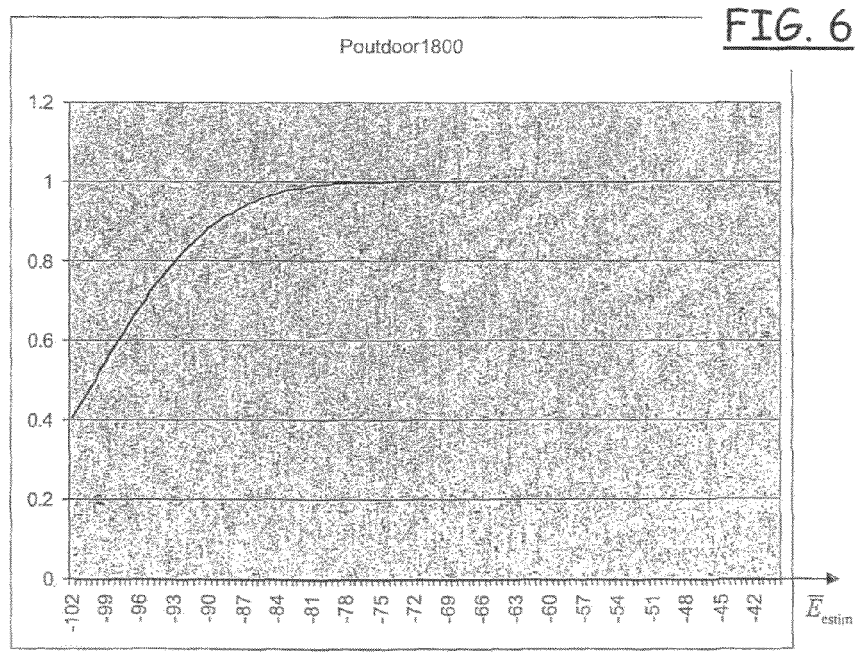
FIG. 6 is a diagram showing a percentage of coverage of a generic outdoor pixel by a GSM 1800 MHz radio layer as dependent on the average values of electromagnetic field estimated by the electromagnetic field distribution simulator.

The curve in FIG. 6 shows the probability $P^{1800}_{outdoor}$ as a function of the average estimated electric field in a generic pixel covered only by the GSM radio signal in the 1800 MHz band, assuming that Edi=0 (absence of buildings).

Let it now the case of Edi=1 be considered, i.e. let it be assumed that the considered pixel area is essentially totally covered by buildings.

In addition to the (slow) fading effect $Err_F$ and the error $Err_M$ introduced by the electromagnetic field distribution simulators, the indetermination in the indoor attenuation margins of the buildings has to be considered. Let M denote a random variable representing the indoor attenuation margin; like the previously calculated random variable $E_{lev}$, the variable M is Gaussian, and has probability density function $$f_M(x) = N(\mu_M, \sigma_M)$$

where $\mu_m$ denotes the average value of the random variable M, and $\sigma_M$ its standard deviation.

Identifying $\sqrt{\sigma_1^2 + \sigma_2^2}$ as $\sigma_{outdoor}$, and being the two variables $E_{lev}$ and M are statistically independent (the attenuation depends on the frequency, not on the electromagnetic field level), the random variable $E_{indoor} = E_{lev} - M$ is a Gaussian random variable, with average value equal to $\overline{E}_{estim} - \mu_M$, standard deviation equal to $\sqrt{\sigma_{outdoor}^2 + \sigma_M^2}$, and probability density $f_{E_{indoor}}(x)$ equal to:

$$F_{E_{indoor}}(x) = N(\overline{E}_{estim} - \mu_M, \sqrt{\sigma_{outdoor}^2 + \sigma_M^2}).$$

Figure 7:
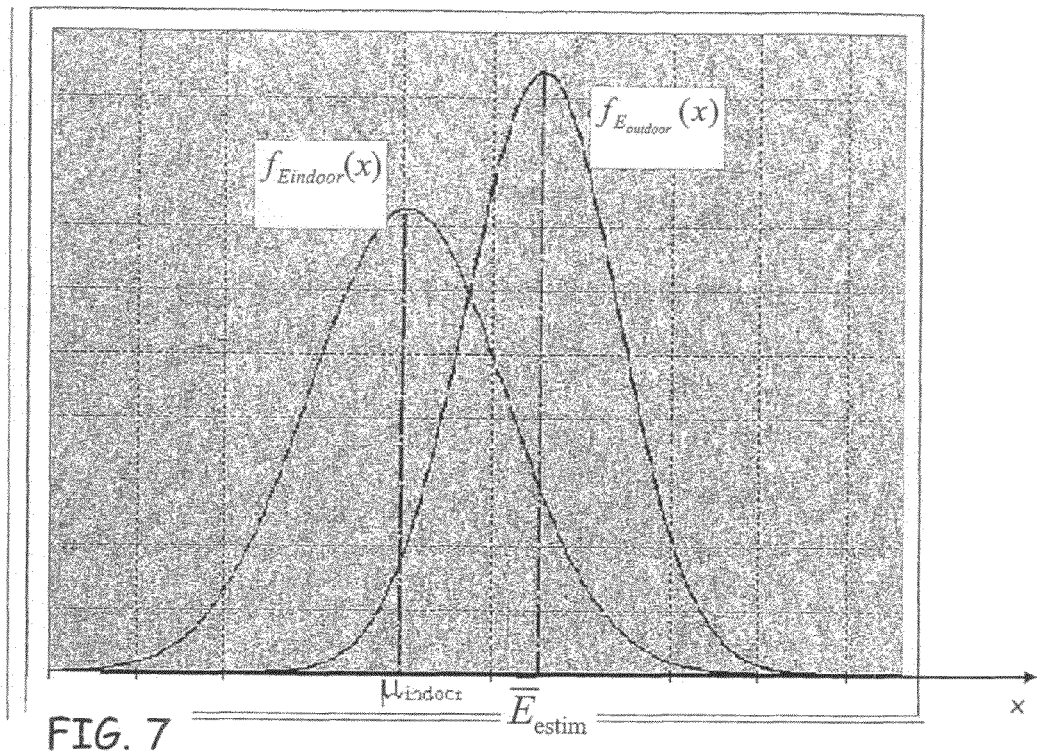
FIG. 7 is a diagram showing a probability density function of the value of the electromagnetic field (generated by the radio base stations of the network) in a generic outdoor pixel of the area under planning, for a generic average value of electromagnetic field estimated by an electromagnetic field distribution simulator, and a corresponding probability density function obtained for a pixel located indoor.

In FIG. 7 there are shown two curves $f_{E_{indoor}}(x)$ and $f_{E_{outdoor}}(x)$, respectively representing the Gaussian probability density function of the real electromagnetic field strength in an outdoor (Edi=0) pixel, and the equivalent probability density function of the real electromagnetic field strength in an indoor pixel (Edi=1), i.e. a pixel whose area is totally covered by buildings.

As in the case of Edi=0, the integral of the probability density function $f_{E_{indoor}}(x)$ gives a function $P_{indoor}$ of the estimated average electromagnetic field $\overline{E}_{estim}$, which provides an indication of the percentage of coverage of the generic pixel considered by the network signal, i.e., the indoor coverage percentage:

$$P_{indoor} = P(E_{indoor} > S) =$$

$$\int_S^{+\infty} f_{E_{indoor}}(x) dx = \begin{cases} 1 - \frac{1}{2} \text{erfc}\left(\frac{S - (\overline{E}_{estim} - \mu_M)}{\sqrt{2\sigma_{indoor}^2}}\right) & \text{if } S \leq \overline{E}_{indoor} \\ \frac{1}{2} \text{erfc}\left(\frac{S - (\overline{E}_{estim} - \mu_M)}{\sqrt{2\sigma_{indoor}^2}}\right) & \text{if } S > \overline{E}_{indoor} \end{cases}$$

where the parameter S denotes, as in the foregoing, the effective sensitivity of the mobile terminal receiver.

Figure 8:
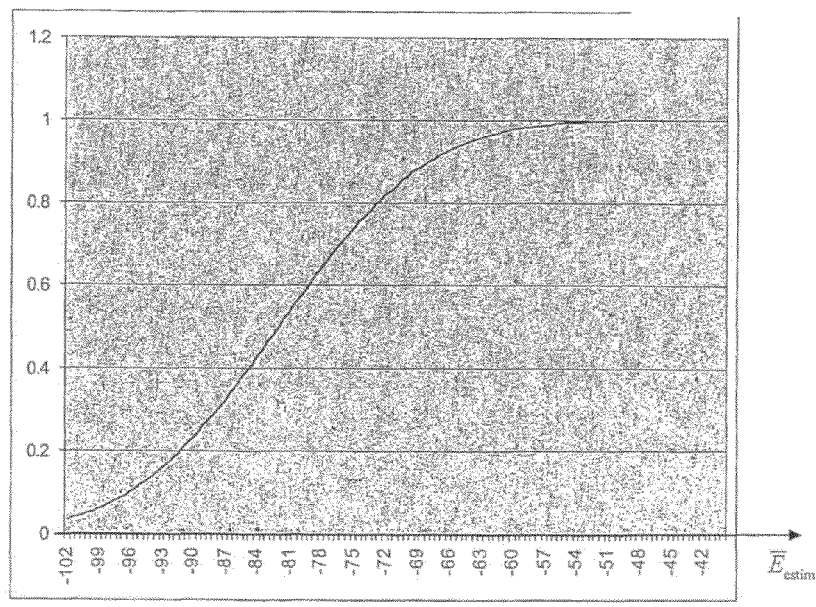
FIG. 8 is a diagram showing a percentage of coverage of a generic, totally indoor pixel by a GSM 1800 MHz radio layer as dependent on the average values of electromagnetic field estimated by the electromagnetic field distribution simulator.

Experimentally, it has been found that the average indoor attenuation margin $\mu_M$ is approximately equal to 18 dB for the GSM 1800 frequency band, and to approximately 15 dB for the GSM 900 frequency band. The curve in FIG. 8 shows the probability $P^{1800}_{indoor}$ as a function of the average estimated electric field in a generic pixel covered only by the GSM radio signal in the 1800 MHz band, assuming that Edi=1.

Let it now the case be considered of a pixel in which the presence of buildings is intermediate between the total absence (Edi=0) and the total coverage (Edi=1), i.e. a pixel which is partially covered by buildings; the value of the parameter Edi will be comprised between 0 and 1; the area of such a pixel can ideally be divided in two portions: a first pixel area portion which is not covered by buildings (for which it is Edi=0), and a second pixel area portion wherein there are buildings (in which it is Edi=1). In the portion of the pixel in which there are buildings, the percentage of coverage by the network signal is expressed by $P_{indoor}$, whereas in the pixel portion where there are no buildings, the percentage of coverage by the network signal is expressed by $P_{outdoor}$. The indoor and outdoor pixel portions thus give two distinct contributes to an overall pixel coverage $P_{tot}$, which contributions are weighted by the value of the parameter Edi:

$$P_{tot} = \frac{Edi}{100} P_{indoor} + \left(1 - \frac{Edi}{100}\right) P_{outdoor}$$

In other words, $P_{tot}$ gives the percentage of penetration of the network coverage in the considered pixel, i.e. the percentage of coverage of the considered pixel by the network signal. In FIG. 9 there are sketched five different curves $P_{tot,a}$, $P_{tot,b}$, $P_{tot,c}$, $P_{tot,d}$ and $P_{tot,e}$ representing the value of $P_{tot}$ for a generic pixel as a function of the average estimated field $\overline{E}_{estim}$, for the five different values of the parameter Edi, namely 0 (outdoor), 0.2, 0.5, 0.8 and 1 (indoor). It can be appreciated that, varying the value of the parameter Edi, a bundle of curves is obtained.

It is observed that the static sensitivity of the cellular phone is for example set forth by the ETSI standard EN 300 910, GSM (05.05 version 8.5.1, 1999), which prescribes a value of −102 dBm (approximately 34 dBμ V/m) for the GSM 900 MHz band, and of −100 dBm (approximately 42 dBμ V/m) for the GSM 1800 MHz band. The body loss margin is for example 7 dBm, whereas the interference margin is for example of 3 dBm; thus, the effective sensitivity is for example equal to −92 dBm for the GSM 900 MHz band, and to −90 dBm for the 1800 MHz band.

Thus, in those cases where the cellular network has two frequency bands of operation f1 and f2, like for example the two bands at 900 MHz and 1800 MHz of most currently deployed GSM networks, the mobile terminal is characterized by two different values $S^{f1}$ and $S^{f2}$ of effective sensitivity. Consequently, if a generic pixel is covered by the radio signal in the frequency band f1 (e.g., 1800 MHz), two probabilities $P^{f1}_{outdoor}$ and $P^{f1}_{indoor}$ will be obtained, whereas if a pixel is covered by the radio signal in the frequency band f2 (e.g., 900 MHz), two different probabilities $P^{f2}_{outdoor}$ and $P^{f2}_{indoor}$ will in general be obtained. Thus, for a generic pixel characterized by a value of the parameter Edi intermediate between 0 and 1, two probabilities $P^{f1}_{tot}$ and $P^{f2}_{tot}$ will in general be obtained, one for each of the two frequency bands.

Furthermore, in those cases wherein a generic radio base station irradiates signals at both the operating frequency bands f1 and f2, and a hierarchy is established between these two operating frequencies, such that the access to the network at the first operating frequency band f1 takes priority over the access at the second operating frequency band f2, a different parameter should be exploited instead of the effective sensitivity of the mobile terminal, particularly the access hierarchy threshold Levthr, which is the hierarchy threshold that prevents the generic mobile terminal to access the network channels in the second (lower-priority) frequency band f2 even if the effective sensitivity $S^{f2}$ of the mobile terminal's receiver is exceeded.

In the remaining of the present description, $P^{f1}_{tot}$ and $P^{f2}_{tot}$ (e.g., $P^{1800}_{tot}$ and $P^{900}_{tot}$) will be simply indicated $P^{f1}$ and $P^{f2}$ (e.g., $P^{1800}$ and $P^{900}$).

From the foregoing description, it can be appreciated that in those pixels where the simulation of the electric field distribution gives a relatively low average electromagnetic field value, the probability of gaining access to the cellular network is lower compared to those pixels wherein, on the contrary, the average electromagnetic field value calculated by the electromagnetic field distribution simulators is relatively high. In other words, if the strength of the electromagnetic field estimated in a generic pixel is high, this means that there is a relatively wide portion of the pixel area in which the mobile terminals sense electromagnetic field levels higher than their sensitivity, and these mobile terminals will be able to gain access to the cellular network; on the contrary, where the strength of the estimated electromagnetic field is low, the portion of the pixel area in which the mobile terminals sense electromagnetic field levels higher than their sensitivity is limited.

According to an embodiment of the present invention, the functions P (e.g., $P^{f1}$ and $P^{f2}$), calculated as described in the foregoing, which express the percentage of coverage of a generic pixel by the signal of the cellular network, i.e. the percentage of penetration of the network coverage in a generic pixel, are exploited as weight factors for distributing the traffic offered to a generic network cell of the area under planning across the different pixels of the cell's best-server area (block 850); it is observed that in the calculation of the best-server area in respect of the generic cell, the effective sensitivity of the mobile terminals is considered.

In particular, by exploiting the functions P (e.g., $P^{f1}$ and $P^{f2}$) for distributing the traffic, those pixels featuring a higher average estimated electromagnetic field value are privileged in the traffic distribution, i.e. they are assigned a higher portion of traffic, with respect those other pixels for which the average estimated electromagnetic field value is lower.

In other words, the use of the functions P (e.g., $P^{f1}$ and $P^{f2}$) for the distribution of the traffic across the pixels allows differentiating pixels which are essentially equivalent from the point of view of the morphology and orography of the territory (i.e., pixels having essentially the same propension of generating traffic, same value of the parameter σ), but which are characterized by different strengths of the electromagnetic field, i.e. which differs from the point of view of the radio signal coverage.

Let it first be assumed that the cellular network under consideration has (at least in the area of interest) only one radio access layer, e.g., the radio access layer corresponding to the GSM 1800 MHz frequency band, or, alternatively, the radio access layer corresponding to the GSM 900 MHz frequency band. The functions P (e.g., $P^{1800}$ or $P^{900}$) can be used in the distribution of the offered traffic to weight the propension to generating traffic $\sigma_{ij}$ of the generic pixel $px_{ij}$, in the following way:

$$T_{ij}^{offered}(1800) = T_{tot}^{offered}(1800) \cdot \frac{P_{ij}^{1800} \cdot \tau_{ij}}{\sum_{pixels \in cell(1800)} P_{ij}^{1800} \cdot \tau_{ij}}$$

or $$T_{ij}^{offered}(900) = T_{tot}^{offered}(900) \cdot \frac{P_{ij}^{900} \cdot \tau_{ij}}{\sum_{pixels \in cell(900)} P_{ij}^{900} \cdot \tau_{ij}}$$

where $T_{ij}^{offered}(1800)$ and $T_{ij}^{offered}(900)$ denote the offered traffic distributed over the pixel $px_{ij}$, $T_{tot}^{offered}(1800)$ is the total traffic offered to the cell under consideration by the 1800 MHz radio access layer, $T_{tot}^{offered}(900)$ is the total traffic offered to the cell under consideration by the 900 MHz radio access layer, $P_{ij}^{1800}$ and $P_{ij}^{900}$ are the functions $P^{1800}$ or $P^{900}$, calculated in the way described above for the pixel $px_{ij}$, i.e., the percentages of penetration of the network radio coverage in the considered pixel, estimated for the frequency band of interest (1800 MHz or 900 MHz), and taking into account the value of the parameter Edi for the considered pixel. As mentioned in the foregoing, the propension to generate traffic $\sigma_{ij}$ is a number ranging from 0 (zero capability of generating traffic) to 1 (maximum capability of generating traffic).

Let instead be assumed that the cellular network under consideration is for example GSM network operating on two hierarchical radio access layers, corresponding for example to the two frequency bands 900 MHz and 1800 MHz; the 1800 MHz frequency band is considered to be the prioritary radio access layer, i.e. when a (dual-band) mobile terminal attempts to access the network, the access by the 1800 MHz frequency band is tried first, whereas the access by the 900 MHz frequency band is only attempted in case the first attempt fails, that is only in case the mobile terminal senses, at the prioritary frequency band of 1800 MHz, an electromagnetic field strength lower than the hierarchical access threshold. It is reasonable (and experimentally verified) to assume that where the strength of the electromagnetic field at 1800 MHz is high, i.e. in those pixels where the value $P_{ij}^{1800}$ is high, the traffic offered to the 900 MHz radio access layer purely is low. Thus, if a generic pixel is covered by radio signals of both the two hierarchical radio access layers, the distribution of the traffic offered to the 900 MHz radio access layer should take into account the percentage of penetration of the network coverage at 1800 MHz; thus:

$$T_{ij}^{offered}(900) = T_{tot}^{offered}(900) \frac{p_{ij}^{900} \cdot \tau_{ij}}{\sum_{pixels \in cell(900)} p_{ij}^{900} \cdot \tau_{ij}} \quad \text{where:}$$

$$p_{ij}^{900} = \max\{0; P_{ij}^{900} - P_{ij}^{1800}\}$$

that is, the weight $p^{900}{}_{ij}$ depends also on the strength of the electromagnetic field at 1800 MHz. Referring to FIG. 10, wherein $A_{px}$ denotes the area of the generic pixel $px_{ij}$, $A_{ns}$ the portion of the pixel area that is not served by the cellular network, $A_{s,1800}$ the portion of the pixel area that is served by the signal at 1800 MHz (the area portion $A_{s,1800}$ being the fraction $P_{ij}^{1800}$ of the pixel area $A_{px}$), and $A_{s,900}$ the portion of the pixel area that is served by the signal at 900 MHz (the area portion $A_{s,900}$ being the fraction $P_{ij}^{900}$ of the pixel area $A_{px}$), making $p_{ij}^{900} = \max\{0; P_{ij}^{900} - P_{ij}^{1800}\}$ means distributing pure 900 MHz offered traffic only in the portion $A_{s,900\ not\ 1800}$ of the pixel area that is penetrated by the signal at 900 MHz and not by the signal at 1800 MHz, whereas the portion $A_{s,1800}$ of the pixel area that is penetrated by the signal at 1800 MHz does not count for the distribution of the 900 MHz traffic.

In those pixels $px_{ij}$ where the electromagnetic field at 900 MHz is strong, the weight $p^{900}{}_{ij}$ will have a non-negligible value only if the average value of the electromagnetic field at 1800 MHz on that pixel is low (i.e., if that pixel is scarcely covered by the radio signal at 1800 MHz); on the contrary, it may happen that no part of the traffic offered to the 900 MHz radio access layer is distributed to the generic pixel $px_{ij}$, in the case $P_{ij}^{1800} > P_{ij}^{900}$, i.e. in the case the pixel is mainly covered by the signal at 1800 MHz.

If the percentages of coverage $P_{ij}^{1800}$ and $P_{ij}^{900}$ of the generic pixel $px_{ij}$ are such as not to cover the full pixel area $A_{px}$, i.e. if $P_{max} = \max(P_{ij}^{900}, P_{ij}^{1800}) < 1$, then there is unexpressed traffic that may, at least potentially, be captured. The value $P_{max}$ thus gives an indication of the served area, and can be exploited to derive a measure of the unexpressed traffic in respect of the generic pixel. Referring again to FIG. 10 and denoting by $A_s$ the portion of the area $A_{px}$ of the pixel $px_{ij}$ that is served by any one of the hierarchic access levels of the network, by $T_{tot}$ the overall traffic offered to the cell in whose best-server area the pixel $px_{ij}$ is included, being $T_{tot} = T_{1800} + T_{900}$ (sum of the overall traffic offered to the cell at 1800 MHz and of the overall traffic offered to the cell at 900 MHz), and by $T_{unexpressed}$ the unexpressed traffic for that cell to be estimated, the following formulas can be written:

$T_{tot} : A_s = T_{unexpressed} : A_{ns}$, and thus:
$T_{unexpressed} = T_{tot} * A_{ns}/A_s$ where $A_s = A * P_{max}$ and $A_{nx} = A_{px} - A_s$. By calculating the values of the unexpressed traffic for the different pixels of the network area under planning 100, it is possible to obtain, for the area under planning, a pixel-by-pixel map of the unexpressed traffic due to the presence of pixels that are at least partially not covered by the network signal (for example, indoor portions of some pixels).

The map thus obtained of unexpressed traffic due to partially uncovered areas is useful to graphically show to the network designer the areas having the higher unexpressed traffic, that can be potentially captured.

Based for example on this map of unexpressed traffic, the network designer may decide to modify the current network deployment, for example by adding new sites (i.e., new radio base stations), and/or modifying the current parameters (e.g., the radio equipments of the radio base stations) of the network in those areas that allow maximizing the captured fresh traffic.

Any change in the current network deployment causes in principle a change in the levels of the electromagnetic field (at both 900 MHz and 1800 MHz) in the pixels of the area under planning. Such a change reflects into a change in the value(s) of the weight factor(s) $P_{ij}$, e.g. $P_{ij}^{1800}$ and $P_{ij}^{900}$, which pass from a previously calculated, old value $P_{ij}^{1800}(old)$, $P_{ij}^{900}(old)$, to new values $P_{ij}^{1800}(new)$, $P_{ij}^{900}(new)$ that are in general different. In order to determine the new values $P_{ij}^{1800}(new)$, $P_{ij}^{900}(new)$, the same steps described in the foregoing are performed, particularly the new distribution of the electromagnetic field is simulated, using the electromagnetic field propagation simulation algorithms.

If, considering the generic pixel, it results:

$P_{max}(new) = \max(P_{ij}^{900}(new), P_{ij}^{1800}(new)) > P_{max}(old) = \max(P_{ij}^{900}(old), P_{ij}^{1800}(old))$ then at least part of the traffic that was previously unexpressed has been captured, and the captured traffic will originate in the considered pixel a fresh traffic given by:

$T_{fresh} = T_{unexpressed} * (P_{max}(new) - P_{max}(old)/(1 - P_{max}(old))$.

Referring to FIG. 10, the area $A_{capt}$ denotes the previously unexpressed traffic that has been captured: The weight factors $P_{ij}^{900}$(new), $P_{ij}^{1800}$(new) calculated for the new network configuration determine the quota of traffic offered to the different hierarchic radio access layer of the network, and thus they take into account possible drainages of traffic from one hierarchic access level to the other.

The traffic distributed across the pixels is then aggregated taking into account of the change possibly occurred in the best-server areas, due to the new network configuration. In particular, all the traffic portions assigned to the pixels that belongs to the area in which a given radio base station (either an already existing radio base station, or a new one that has been introduced) is the best server, for the respective hierarchic radio access layer, are cumulated:

$$T_{tot}^{offered} = \sum_{pixel \in cell} T_{ij}(\text{new}).$$

Based on the re-aggregated offered traffic $T_{tot}^{offered}$ that is thus obtained, the estimation of traffic for the different network cells of the area under planning is obtained, and the network designer will be able to choose the best radio resource dimensioning for the cells of the area considered.

For the generic pixel $px_{ij}$, the estimated traffic is given by the following expressions:

$$T_{ij}^{1800}(\text{new}) = T_{ij}^{1800}(\text{old}) + T_{ij}^{900}(\text{drained}) - T_{ij}^{1800}(\text{non-offerable}) - T_{ij}^{1800}(\text{returned}) + T_{ij}^{1800}(\text{unexpressed})$$

and $$T_{ij}^{900}(\text{new}) = T_{ij}^{900}(\text{old}) - T_{ij}^{900}(\text{drained}) + T_{ij}^{1800}(\text{returned}) - T_{ij}^{900}(\text{non-offerable}) + T_{ij}^{900}(\text{unexpressed})$$

where:
- $T_{ij}^{900}$(drained) is a percentage of the traffic previously attributed to the 900 MHz level on the pixel $px_{ij}$, and that is transferred to the 1800 MHz level, thanks to an improvement in the electromagnetic coverage by the radio signal at 1800 MHz;

$T_{ij}^{1800}$(returned) is a percentage of the traffic attributed to the 1800 MHz level on the pixel $px_{ij}$ that, due to a worsening of the electromagnetic field distribution at 1800 MHz, can no more be attributed to the 1800 MHz level, but needs to be assigned back to the 900 MHz level, if present;

$T_{ij}^{1800}$(non-offerable), respectively $T_{ij}^{900}$(non-offerable), is a fraction of traffic at 1800 MHz, respectively 900 MHz, that can no more be offered to any of the hierarchical access levels, because the electromagnetic field coverage at both the two 900 MHz and 1800 MHz levels decreases (the average electromagnetic field estimated by the simulator decreases);

$T_{ij}^{1800}$(unexpressed), respectively $T_{ij}^{900}$(unexpressed), is the percentage of traffic potentially unexpressed that is captured by the 1800 MHz level, respectively by the 900 MHz level.

In case the network configuration is not changed after the initial distribution of the traffic across the different pixels, the traffic offered to the pixels remains equal to that distributed; in such a case, $T_{ij}^{1800}(\text{new}) = T_{ij}^{1800}(\text{old})$, and $T_{ij}^{900}(\text{new}) = T_{ij}^{900}(\text{old})$.

The traffic components $T_{ij}^{900}$(drained), $T_{ij}^{1800}$(returned), $T_{ij}^{1800}$(non-offerable), $T_{ij}^{900}$(non-offerable), $T_{ij}^{1800}$(unexpressed) and $T_{ij}^{900}$(unexpressed) can be expressed as a function of the percentages of coverage of the pixel $px_{ij}$ by the two hierarchical access levels, i.e. $P_{ij}^{1800}$(old), $P_{ij}^{900}$(old), $P_{ij}^{1800}$(new), and $P_{ij}^{900}$(new). The following formulas can be derived:

$$T_{ij}^{900}(\text{drained}) = T_{ij}^{900}(\text{old}) \frac{\max\left\{0, \min(P_{ij}^{1800}(\text{new}), P_{ij}^{900}(\text{old})) - P_{ij}^{1800}(\text{old})\right\}}{P_{ij}^{900}(\text{old}) - P_{ij}^{1800}(\text{old})}$$

if and only if $P_{ij}^{900}(\text{old}) > P_{ij}^{1800}(\text{old})$;

$$T_{ij}^{1800}(\text{returned}) = T_{ij}^{1800}(\text{old}) \frac{\min\left\{0, (P_{ij}^{1800}(\text{new}) - \min(P_{ij}^{900}(\text{new}), P_{ij}^{1800}(\text{old}))\right\}}{P_{ij}^{1800}(\text{old})};$$

$$T_{ij}^{1800}(\text{non-offerable}) = T_{ij}^{1800}(\text{old}) \frac{\min\left\{0, \min(P_{ij}^{max}(\text{new}), P_{ij}^{1800}(\text{old})) - P_{ij}^{900}(\text{old}))\right\}}{P_{ij}^{1800}(\text{old})};$$

$$T_{ij}^{900}(\text{non-offerable}) = T_{ij}^{900}(\text{old}) \frac{\min\left\{0, \max(P_{ij}^{900}(\text{new}), P_{ij}^{1800}(\text{old})) - P_{ij}^{900}(\text{old})\right\}}{P_{ij}^{900}(\text{old}) - P_{ij}^{1800}(\text{old})}$$

if and only if $P_{ij}^{900}(\text{old}) > P_{ij}^{1800}(\text{old})$;

$$T_{ij}^{1800}(\text{unexpressed}) = T_{unexpressed} \frac{\max\left\{\begin{array}{l}P_{max}(\text{old}),\\ P_{ij}^{1800}(\text{new})\end{array}\right\} - P_{max}(\text{old})}{1 - P_{max}(\text{old})}$$

if and only if $P_{max}(\text{new}) > P_{max}(\text{old})$; and $$T_{ij}^{900}(\text{unexpressed}) = T_{unexpressed} \frac{P_{max}(\text{old}) - \max\left\{\begin{array}{l}P_{ij}^{900}(\text{old}),\\ P_{ij}^{1800}(\text{new})\end{array}\right\}}{1 - P_{max}(\text{old})}$$

if and only if $P_{max}(\text{new}) > P_{max}(\text{old})$.

From the above formulas, it can be appreciated that:

a) there is a drainage of traffic from the 900 MHz level towards the 1800 MHz level only in case $P_{ij}^{900}(\text{old}) > P_{ij}^{1800}(\text{old})$;

b) there is a restitution of traffic by the 1800 MHz level to the 900 MHz level only if the percentage of coverage of the pixel by the 1800 MHz level decreases in consequence of the change in the network configuration;

c) the non-offerable traffic components (which may take values $\leq 0$) differ from zero only if the percentage of coverage of the pixel by the 1800 MHz level, and/or the percentage of coverage of the pixel by the 900 MHz level, decreases; and d) there are unexpressed traffic components if and only if $P_{max}(\text{new}) > P_{max}(\text{old})$, i.e. if and only if the percentage of coverage of the pixel increases in consequence of the change in the network configuration.

Hereinafter, four practical examples are reported.

EXAMPLE 1

Let it be assumed that, as a consequence of the change in the network configuration following the distribution of the traffic across the pixels of the area of interest, the level of the electromagnetic field associated with the 1800 MHz band increases in a certain pixel $px_{ij}$; this can for example result from the introduction of a new site (radio base station) operating at 1800 MHz, and/or by the change in some parameter of an already existing radio base station operating at 1800 MHz.

Since the average estimated electromagnetic field at 1800 MHz, estimated by the electromagnetic field propagation simulator, increases in the considered pixel, the percentage of coverage $P_{ij}^{1800}$(new) of that pixel by the 1800 MHz layer increases, i.e. $P_{ij}^{1800}$(new)>$P_{ij}^{1800}$(old).

Figure 11:
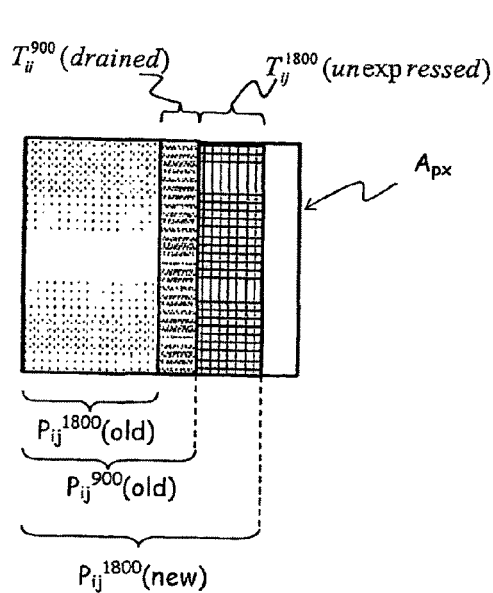

It is assumed that the percentage of coverage $P_{ij}^{900}$(new) of that pixel by the 800 MHz layer remains unchanged, i.e. $P_{ij}^{900}$(new)=$P_{ij}^{900}$(old), and that $P_{ij}^{1800}$(new)>$P_{ij}^{900}$(old). The situation is depicted in FIG. 11, adopting a schematization similar to that adopted in FIG. 10.

The traffic offered to that pixel by the two hierarchical levels is:

$$T_{ji}^{1800}(\text{new})=T_{ij}^{1800}(\text{old})+T_{ij}^{900}(\text{drained})+T_{ij}^{1800}(\text{unexpressed});$$

$$T_{ij}^{900}(\text{new})=T_{ij}^{900}(\text{old})-T_{ij}^{900}(\text{drained});$$

$T_{ij}^{1800}$(unexpressed) is a new, fresh traffic that is offered to the pixel considered.

EXAMPLE 2

Figure 12:
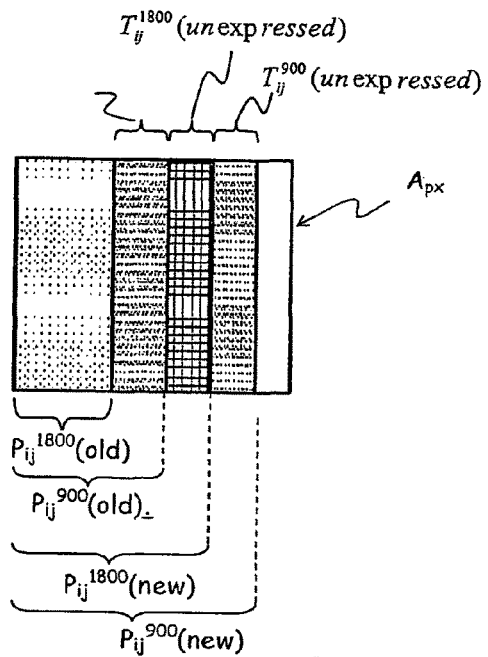

Let it be assumed that, for a generic pixel $px_{ij}$, it is $P_{ij}^{1800}$(new)>$P_{ij}^{1800}$(old), and $P_{ij}^{900}$(new)>$P_{ij}^{900}$(old), like in FIG. 12. In this case, not only the layer at 1800 MHz, but also the layer at 900 MHz captures an unexpressed traffic:

$$T_{ij}^{1800}(\text{new})=T_{ij}^{1800}(\text{old})+T_{ij}^{900}(\text{drained})+T_{ij}^{1800}(\text{unexpressed})$$

$$T_{ij}^{900}(\text{new})=T_{ij}^{900}(\text{old})-T_{ij}^{900}(\text{drained})+T_{ij}^{900}(\text{unexpressed}).$$

EXAMPLE 3

Figure 13:
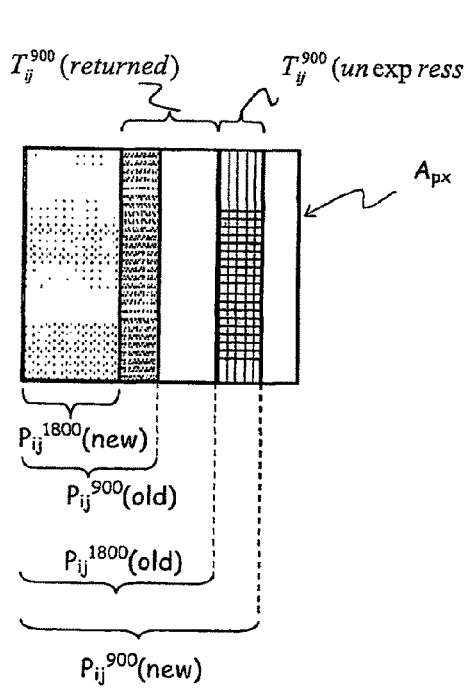

It is supposed that, in a generic pixel $px_{ij}$, the percentage of coverage by the layer at 1800 MHz, initially higher than the corresponding percentage of coverage by the layer at 900 MHz, drops below the latter, i.e. that $P_{ij}^{1800}$(new)>$P_{ij}^{900}$(old), and at the same time the percentage of coverage by the layer at 900 MHz increases, i.e. $P_{ij}^{900}$(new)>$P_{ij}^{900}$(old). The situation is depicted in FIG. 13 In this case, the 1800 MHz layer returns traffic to the 900 MHz layer:

$$T_{ij}^{1800}(\text{new})=T_{ij}^{1800}(\text{old})-T_{ij}^{1800}(\text{returned})$$

$$T_{ij}^{900}(\text{new})=T_{ij}^{900}(\text{old})+T_{ij}^{1800}(\text{returned})+T_{ij}^{900}(\text{unexpressed}):$$

EXAMPLE 4

Figure 14:
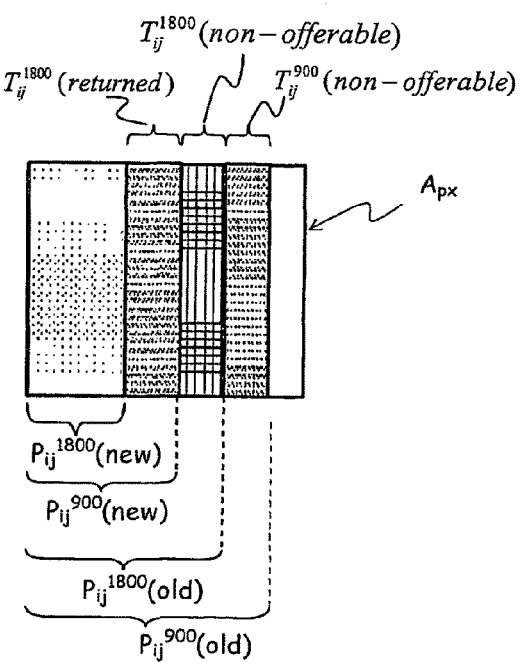

As a further example, it is assumed that, in a generic pixel $p_{ij}$, the percentages of coverage by both the layer at 1800 MHz and the layer at 900 MHz decreases, i.e.: $P_{ij}^{1800}$(new)<$P_{ij}^{1800}$(old), and $P_{ij}^{900}$(new)<$P_{ij}^{900}$(old); the situation is depicted in FIG. 14.

In this case, a larger portion of the pixel area is uncovered compared to the initial situation, thus there is traffic that is no more offerable (because no more reachable) to the two hierarchical levels:

$$T_{ij}^{1800}(\text{new})=T_{ij}^{1800}(\text{old})-T_{ij}^{1800}(\text{non-offerable})-T_{ij}^{1800}(\text{returned})$$

$$T_{ij}^{900}(\text{new})=T_{ij}^{900}(\text{old})+T_{ij}^{1800}(\text{returned})-T_{ij}^{900}(\text{non-offerable})$$

§§§§

Thanks to the described method, it is possible to achieve a distribution of the offered traffic which is very true to reality, and thus provides a rather reliable basis for evaluating whether an existing network configuration is suitable or needs to be changed, so as to being able to serve more traffic and improve the quality of the service perceived by the users.

Figure 15:
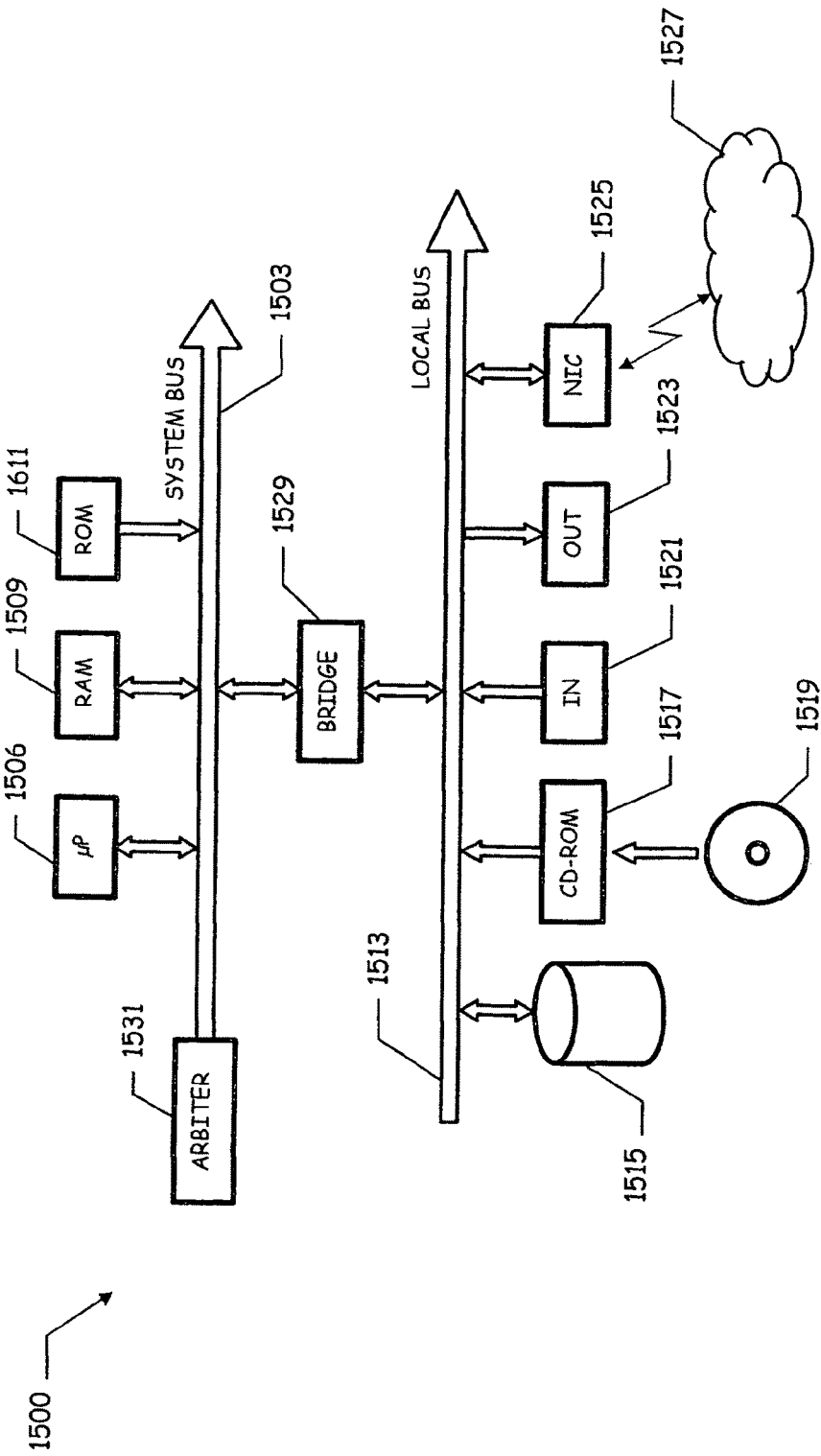
FIG. 15 schematically shows the main functional components of a data processing apparatus that, suitably programmed, is adapted to carry out the method according to an embodiment of the invention.

The above described method may in particular be carried out by a suitably programmed data processing apparatus or system like a personal computer or a workstation; the structure of a general-purpose computer 1500 is schematically depicted in FIG. 15.

The computer 1500 is comprised of several units that are connected in parallel to a system bus 1503. In detail, one (possibly more) processor (μp) 1506 controls the operation of the computer 1500; a RAM 1509 is directly used as a working memory by the microprocessor 1506, and a ROM 1511 stores the basic code for a bootstrap of the computer 1500. Peripheral units are connected (by means of respective interfaces) to a local bus 1513. Particularly, mass storage devices comprise a hard disk 1515 and a CD-ROM/DVD-ROM drive 1517 for reading CD-ROMs/DVD-ROMs 1519. Moreover, the computer 1500 typically includes input devices 1521, for example a keyboard and a mouse, and output devices 1523, such as a display device (monitor) and a printer. A Network Interface Card (NIC) 1525 is used to connect the computer 1500 to a network 1527, e.g. a LAN. A bridge unit 1529 interfaces the system bus 1503 with the local bus 1513. Each microprocessor 1506 and the bridge unit 1529 can operate as master agents requesting an access to the system bus 1503 for transmitting information; an arbiter 1531 manages the granting of the access to the system bus 1503.

Figure 16:
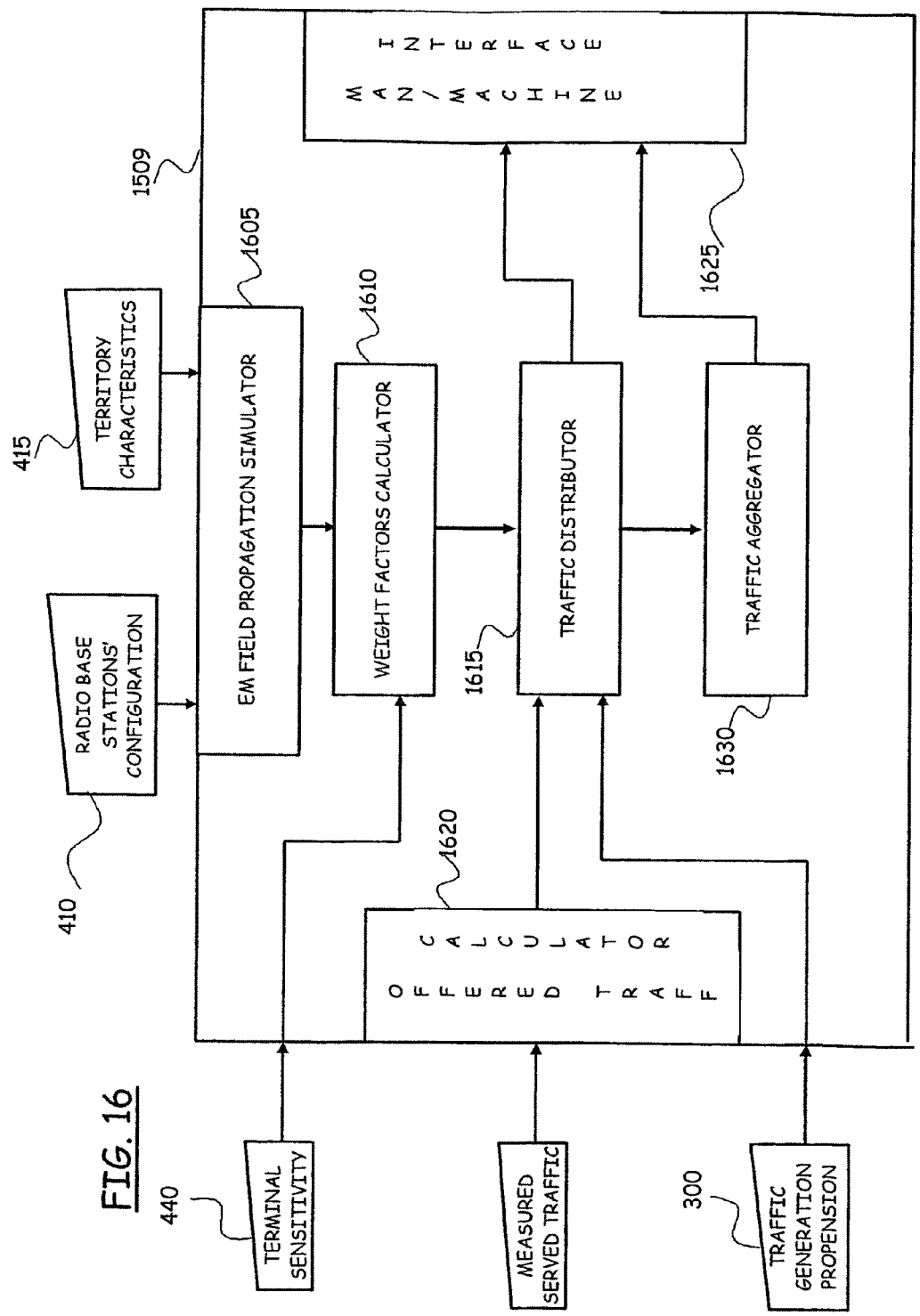
FIG. 16 schematically shows the main components of a program, when executed on the data processing apparatus of FIG. 15, implementing the method according to an embodiment of the present invention.

In FIG. 16, computer program components adapted to implement the above-described method are schematically shown, according to an embodiment of the invention. In particular, FIG. 16 schematically depicts a partial content of the working memory 1509 of the computer of FIG. 15. The information (programs and data) is typically stored on the hard disks and loaded (at least partially) into the working memory when the program is executed. The programs may be initially installed onto the hard disks from, e.g., CD-ROMs or DVD-ROMs, or they may be downloaded from, e.g., a distribution server machine through the data communications network 1527.

An electromagnetic field propagation simulator module 1605 calculates the distribution of the electromagnetic field given the configuration 410 of the radio base stations and the characteristics 415 of the territory in the area of interest 100, which are inputs to the program.

A weight factors calculator module 1610 calculates, for each pixel, the respective weight factor Pij, based on the distribution of the electromagnetic field and the mobile terminals' sensitivity S 440.

A traffic distributor module 1615 distributes an offered traffic, calculated from the measured served traffic by an offered traffic calculator module 1620, based on the traffic generation propension 300, weighted by the weight factors Pij.

A man/machine interface module 1625, e.g. a graphical user interface, allows displaying the results of the traffic distribution process to the operator.

A traffic aggregator module 1630 re-aggregates the distributed traffic.

It is observed that at least some of the modules described above may take the form of different, independent software programs.

The present invention has been disclosed by describing an exemplary embodiment thereof, however those skilled in the art, in order to satisfy contingent needs, will readily devise modifications to the described embodiment, as well as alternative embodiments, without for this reason departing from the protection scope defined in the appended claims.

In particular, although in the described embodiment the case of a GSM network has been considered, this is not to be construed as a limitation to the present invention, which is more generally applicable to different types of cellular networks, like for example CDMA-based networks such as UMTS networks.

The invention claimed is:

1. A method for estimating a territorial distribution of traffic in a selected area of a cellular radio mobile communications network; comprising:
   dividing the selected area into a plurality of traffic-generating area elements;
   determining overall traffic in respect of said selected network area; and
   distributing the overall traffic across the plurality of traffic-generating area elements, said distributing further comprising:
   calculating, for each of said traffic-generating area elements, a respective network traffic generation propension, wherein said network traffic generation propension is adapted to provide an indication of a forecasted population of users of the network in respect of the traffic generating area element;
   estimating a distribution of a radio electromagnetic field associated with a current network configuration across said selected area, said estimating comprising obtaining an indication of the radio electromagnetic field strength in each of said traffic-generating area elements based on a configuration of radio base stations; and
   assigning to each of said traffic-generating area elements a respective overall traffic portion based on the respective network traffic generation propension and the respective indication of the radio electromagnetic field strength of the configuration of radio base stations, wherein the assigning comprises weighting the network traffic generation propension of each of said traffic-generating area elements by means of the respective indication of the radio electromagnetic field strength of the configuration of radio base stations.

2. The method according to claim 1, wherein said calculating, for each traffic-generating area element, a respective network traffic generation propension is based on information regarding the territorial characteristics of the selected network area.

3. The method according to claim 2, wherein said territorial characteristics of the selected network area comprise at least one among information about a density of communications routes, information about a density of buildings, and information about a territory morphology.

4. The method according to claim 1, wherein said obtaining an indication of the radio electromagnetic field strength of the configuration of radio base stations in each of said traffic-generating area elements comprises taking into account a respective degree of occupation by buildings of said traffic-generating area elements.

5. The method according to claim 4, wherein said obtaining an indication of the radio electromagnetic field strength of the configuration of radio base stations in each of said traffic-generating area elements further comprises taking into account fading effects affecting the radio electromagnetic field perceived in said traffic-generating area elements.

6. The method according to claim 4, wherein said obtaining an indication of the radio electromagnetic field strength of the configuration of radio base stations in each of said traffic-generating area elements further comprises taking into account errors introduced by a process of estimating of the distribution of the radio electromagnetic field.

7. The method according to claim 4, comprising calculating a probability density function of a value of the radio electromagnetic field perceived in said traffic-generating area elements.

8. The method according to claim 7, further comprising obtaining an indication of probability of coverage of each of said traffic-generating area elements by the radio electromagnetic field based on a predetermined sensitivity of mobile terminals intended to exploit the services of the network, and using said indication of probability of coverage for assigning to each of said traffic-generating area elements a respective overall traffic portion.

9. The method according to claim 1, further comprising obtaining an indication of probability of coverage of each of said traffic-generating area elements by the radio electromagnetic field based on a predetermined sensitivity of mobile terminals intended to exploit the services of the network, and using said indication of probability of coverage for assigning to each of said traffic-generating area elements a respective overall traffic portion, wherein said weighting comprises using the indication of probability of coverage.

10. The method according to claim 9, further comprising exploring the indication of probability of coverage of the traffic-generating area elements by the radio electromagnetic field for calculating an indication of unexpressed network traffic in respect of the traffic-generating area elements.

11. The method according to claim 1, wherein the cellular radio mobile communications network comprises at least a first and a second radio access layers, said first radio access layer taking priority over the second radio access layer, wherein said distributing the overall traffic across the plurality of traffic-generating area elements comprises:
   conditioning the distribution of the overall traffic in respect of the second radio access layer to the distribution of the overall traffic in respect of the first radio access layer.

12. The method according to claim 11, further comprising obtaining an indication of probability of coverage of each of said traffic-generating area elements by the radio electromagnetic field based on a predetermined sensitivity of mobile terminals intended to exploit the services of the network, and using said indication of probability of coverage for assigning to each of said traffic-generating area elements a respective overall traffic portion, wherein said obtaining an indication of probability of coverage of the traffic-generating area elements comprises obtaining indications of probability of coverage of the traffic-generating area elements in respect of the at least a first and a second radio access layers, said indications of probability being calculated based on a predetermined access hierarchy threshold establishing when access to the second radio access layer is prevented in favor of an access to the first radio access layer.

13. A system comprising at least one radio base station adapted to carry out the steps of the method according to claim 1.

14. A method comprising:
   estimating a territorial distribution of traffic in a selected area of a cellular radio mobile communications network; and
   based on the estimated traffic distribution, modifying a current network configuration into a new network configuration,
   said estimating being accomplished by the steps of:
   dividing the selected area into a plurality of traffic-generating area elements;

determining overall traffic in respect of said selected network area; and distributing the overall traffic across the plurality of traffic-generating area elements, said distributing further comprising:

calculating, for each of said traffic-generating area elements, a respective network traffic generation propension, wherein said network traffic generation propension is adapted to provide an indication of a forecasted population of users of the network in respect of the traffic generating area element;

estimating a distribution of a radio electromagnetic field associated with a current network configuration across said selected area, said estimating comprising obtaining an indication of the radio electromagnetic field strength in each of said traffic-generating area elements based on a configuration of radio base stations; and assigning to each of said traffic-generating area elements a respective overall traffic portion based on the respective network traffic generation propension and the respective indication of the radio electromagnetic field strength of the configuration of radio base stations, wherein the assigning comprises weighting the network traffic generation propension of each of said traffic-generating area elements by means of the respective indication of the radio electromagnetic field strength of the configuration of radio base stations.

15. The method according to claim 14, further comprising, after said modifying:

estimating again the territorial distribution of traffic in the selected area, wherein said estimating again comprises estimating a new distribution of the radio electromagnetic field associated with the new network configuration across the selected area; and calculating, for each traffic-generating area element, a respective fresh network traffic component, originated by said new network configuration.

16. The method according to claim 15, further comprising, after said estimating again the territorial distribution of traffic, re-aggregating the traffic of the traffic-generating area elements.

17. The method according to claim 14, comprising:

calculating a probability density function of a value of the radio electromagnetic field perceived in said traffic-generating area elements; and obtaining an indication of probability of coverage of each of said traffic-generating area elements by the radio electromagnetic field based on a predetermined sensitivity of mobile terminals intended to exploit the services of the network, and using said indication of probability of coverage for assigning to each of said traffic-generating area elements a respective overall traffic portion.

18. A non-transitory computer-readable storage medium having stored thereon a program comprising instructions that, when executed by a processor of a data processing system, carry out the method comprising:

dividing the selected area into a plurality of traffic-generating area elements;

determining overall traffic in respect of said selected network area; and distributing the overall traffic across the plurality of traffic-generating area elements, said distributing further comprising:

calculating, for each of said traffic-generating area elements, a respective network traffic generation propension, wherein said network traffic generation propension is adapted to provide an indication of a forecasted population of users of the network in respect of the traffic generating area element;

estimating a distribution of a radio electromagnetic field associated with a current network configuration across said selected area, said estimating comprising obtaining an indication of the radio electromagnetic field strength in each of said traffic-generating area elements based on a configuration of radio base stations; and assigning to each of said traffic-generating area elements a respective overall traffic portion based on the respective network traffic generation propension and the respective indication of the radio electromagnetic field strength of the configuration of radio base stations, wherein the assigning comprises weighting the network traffic generation propension of each of said traffic-generating area elements by means of the respective indication of the radio electromagnetic field strength of the configuration of radio base stations.

19. The non-transitory computer-readable storage medium according to claim 18, wherein the method further comprises:

calculating a probability density function of a value of the radio electromagnetic field perceived in said traffic-generating area elements; and obtaining an indication of probability of coverage of each of said traffic-generating area elements by the radio electromagnetic field based on a predetermined sensitivity of mobile terminals intended to exploit the services of the network, and using said indication of probability of coverage for assigning to each of said traffic-generating area elements a respective overall traffic portion.

* * * * *